United States Patent
van Leeuwen et al.

(10) Patent No.: US 10,753,724 B2
(45) Date of Patent: Aug. 25, 2020

(54) COMMON-PATH INTEGRATED LOW COHERENCE INTERFEROMETRY SYSTEM AND METHOD THEREFOR

(71) Applicant: IXA AMC Office / Academic Medical Center, Amsterdam (NL)

(72) Inventors: Antonius van Leeuwen, Bussum (NL); Frank Coumans, Amsterdam (NL); Nicolás Weiss, Amsterdam (NL)

(73) Assignee: Academisch Medisch Centrum, Amsterdam (NL)

( * ) Notice: Subject to any disclaimer, the term of this patent is extended or adjusted under 35 U.S.C. 154(b) by 63 days.

(21) Appl. No.: 15/736,109

(22) PCT Filed: Jun. 16, 2016

(86) PCT No.: PCT/EP2016/063911
§ 371 (c)(1),
(2) Date: Dec. 13, 2017

(87) PCT Pub. No.: WO2016/202930
PCT Pub. Date: Dec. 22, 2016

(65) Prior Publication Data
US 2019/0003820 A1    Jan. 3, 2019

(30) Foreign Application Priority Data

Jun. 16, 2015 (EP) .................................. 15172420

(51) Int. Cl.
*G01B 9/02* (2006.01)
(52) U.S. Cl.
CPC ....... *G01B 9/02091* (2013.01); *G01B 9/0209* (2013.01); *G01B 9/02015* (2013.01);
(Continued)

(58) Field of Classification Search
CPC ............ G01B 9/02015; G01B 9/02051; G01B 9/02057; G01B 9/02091
See application file for complete search history.

(56) References Cited

U.S. PATENT DOCUMENTS 6,144,449 A    11/2000  Knuettel et al.
7,242,480 B2    7/2007  Alphonse
(Continued)

OTHER PUBLICATIONS

"Extended European Search Report" issued in EP priority application No. 15172420, dated Mar. 22, 2016.
(Continued)

*Primary Examiner* — Michael A Lyons
(74) *Attorney, Agent, or Firm* — Kaplan Breyer Schwarz, LLP

(57) ABSTRACT

A low coherence interferometry imaging system comprising a common-path interferometer that is at least partially integrated as part of a planar lightwave circuit is disclosed. Imaging systems in accordance with the present invention are implemented in integrated optics without the inclusion of highly wavelength-sensitive components. As a result, they exhibit less wavelength dependence than PLC-based interferometers of the prior art. Further, the common-path interferometer arrangement of the present invention avoids polarization and wavelength dispersion effects that plague prior-art PLC-based interferometers. Still further, an integrated common-path interferometer is smaller and less complex than other integrated interferometers, which makes it possible to integrate multiple interferometers on a single chip, thereby enabling multi-signal systems, such as plane-wave parallel OCT systems.

21 Claims, 13 Drawing Sheets

(52) U.S. Cl.
CPC ..... *G01B 9/02051* (2013.01); *G01B 9/02057* (2013.01); *G01B 9/02058* (2013.01)

(56) References Cited

U.S. PATENT DOCUMENTS

| | | | |
|---|---|---|---|
| 7,426,036 | B2 | 9/2008 | Feldchtein et al. |
| 7,428,053 | B2 | 9/2008 | Feldchtein et al. |
| 7,480,059 | B2 | 1/2009 | Zhou et al. |
| 7,821,643 | B2 | 10/2010 | Amazeen et al. |
| 8,804,127 | B2 | 8/2014 | Shimoyama et al. |
| 2002/0015155 | A1* | 2/2002 | Pechstedt ............... G01D 5/266 356/477 |
| 2004/0246490 | A1 | 12/2004 | Wang |
| 2013/0321820 | A1 | 12/2013 | Flanders et al. |
| 2014/0125983 | A1* | 5/2014 | Nitkowski ......... G01B 9/02051 356/450 |
| 2014/0160488 | A1 | 6/2014 | Zhou |
| 2014/0233016 | A1 | 8/2014 | Aiyer |
| 2014/0285812 | A1 | 9/2014 | Levitz |
| 2014/0376000 | A1 | 12/2014 | Swanson et al. |
| 2016/0246009 | A1* | 8/2016 | Jiang ...................... G02B 6/124 |

OTHER PUBLICATIONS

Marc De Fre et al., "Agfa HealthCare launches SKINTELL* non-invasive high-definition Optical Coherence Tomography solution", http://www.agfahealthcare.com/global/en/main/news_events/news/archive/he20120926_skintell.jsp, dated Sep. 26, 2012, Publisher: AGFA Healthcare, Published in: BE.

V. Duc Nguyen et al., "Spectral domain optical coherence tomography imaging with an integrated optics spectrometer", "Optics Letters", dated Apr. 1, 2011, vol. 36, No. 7.

B. Imran Akca et al., "Toward Spectral-Domain Optical Coherence Tomography on a Chip", "IEEE Journal of Selected Topics in Quantum Electronics", dated May 1, 2012, vol. 18, No. 3.

B. I. Akca, "Miniature spectrometer and beam splitter for an optical coherence tomography on a silicon chip", DOI:10.1364/OE.21.016648, "Optics Express", dated Jul. 15, 2013, vol. 21, No. 14, Publisher: Optical Society of America.

"Optomoscope M2—Fast 3D Microscopy", accessed Mar. 24, 2015, Publisher: Heliotis AG.

Jin U. Kang et al., "Endoscopic Functional Fourier Domain Common Path Optical Coherence Tomography for Microsurgery", "IEEE Sel Top Quantum Electron", dated Jul. 1, 210, pp. 781-792, vol. 16, No. 4.

Ji-Hyun Kim et al., "Common-Path Optical Coherence Tomography Using a Conical-Frustum-Tip Fiber Probe", DOI: 10.1109/JSTQE.2013.2277817, "Selected Topics in Quantum Electronics, IEEE Journal of", dated Aug. 15, 2013, vol. 120, No. 2, Publisher: IEEE.

Gabriel Montaldo et al., "Coherent Plane-Wave Compounding for Very High Frame Rate Ultrasonography and Transient Elastography", "IEEE Transactions on Ultrasonics, Ferroelectrics, and Frequency Control", dated Mar. 1, 2009, vol. 56, No. 3.

V. Duc Nguyen et al., "Integrated-optics-based swept-source optical coherence tomography", XP001579074, "Optics Letters", dated Dec. 1, 2012, vol. 37, No. 23.

Duc Van Nguyen, "Integrated-optics-based Ooptical Coherence Tomography", dated 2013, Publisher: University of Amsterdam.

"Optical Coherence Tomography RS-3000 Lite", accessed Mar. 24, 2015, Publisher: Nidek Co., Ltd.

"OCT Common-Path Interferometer", accessed Mar. 24, 2015, https://www.thorlabs.com/newgrouppage9_pf.cfm?guide=10&category_id=220&objectgroup_id=2955, Publisher: Thorlabs.com.

"Optical Coherence Tomography 3D OCT-2000", dated 2014, , Publisher: Topcon Medical Systems, Inc., Published in: US.

U. Sharma et al., "All-fiber common-path optical coherence tomography: sensitivity optimization and system analysis", DOI: 10.1109/JSTQE.2005.857380, "Selected Topics in Quantum Electronics, IEEE Journal of", dated Jul. 1, 2005, pp. 799-805, vol. 11, No. 4, Publisher: IEEE.

Andrei B. Vakhtin et al., "Common-path interferometer for frequency-domain optical coherence tomography", "Applied Optics", dated Dec. 1, 2003, vol. 42, No. 34, Publisher: Optical Society of America.

"VivoSight", www.vivosight.com, accessed Mar. 24, 2015, Publisher: Michelson Diagnostics.

Gunay Yurtsever et al., "Ultra-compact silicon photonic integrated interferometer for swept-source optical coherence tomography", "Optics Letters", dated Sep. 1, 2014, vol. 39, No. 17, Publisher: Optical Society of America.

"Cirrus HD-OCT", accessed Mar. 24, 2015, Publisher: Carl Zeiss Meditec, Inc.

"Partial European Search Report" issued in EP priority application No. 15172420, dated Dec. 3, 2015.

Authorized Officer: Choulouilidou, Chrissanthi, "International Search Report and Written Opinion of the International Searching Authority" issued in counterpart PCT application No. PCT/EP2016/063911, dated Dec. 13, 2016.

Authorized Officer: Choulouilidou, Chrissanthi, "Partial International Search Report" issued in counterpart PCT application No. PCT/EP2016/063911, dated Oct. 18, 2016.

James A. Walker, Patent Agent, "Search Report RE: AMC Disclosure for Apparatus and method based on integrated photonics to image reflected and backscattered light to quantify dynamical processes and structures", dated Apr. 2, 2015, p. 4, Publisher: Kaplan Breyer Schwarz & Ottesen, LLC, Published in: US.

"Spectral Domain Optical Coherence Tomography (SD-OCT)", Heidelberg Engineering, http://www.heidelbergengineering.com/us/products/spectralis-models/technology/spectral-domain-oct/, Mar. 24, 2015.

"MOPTIM", OCT for Life Science OSLF-1500, http://www.moptim.cn/en/class.asp?LarCode=OCT%20For%20Life%20Science%20OSLF-1500, Mar. 24, 2015.

* cited by examiner

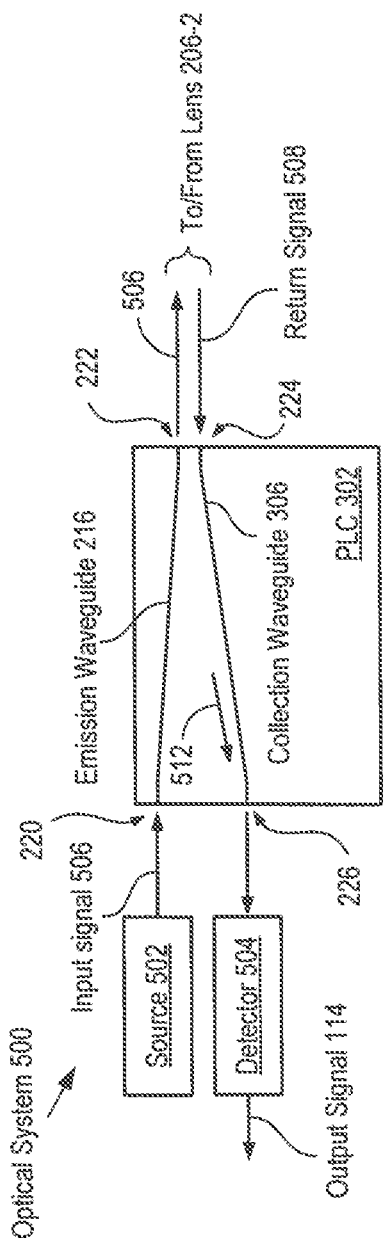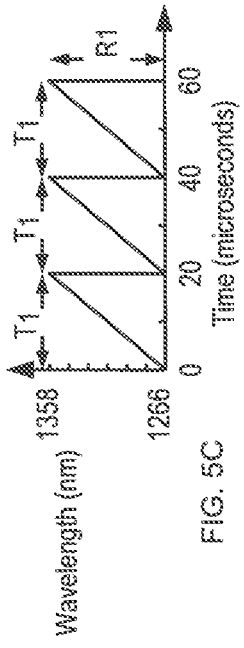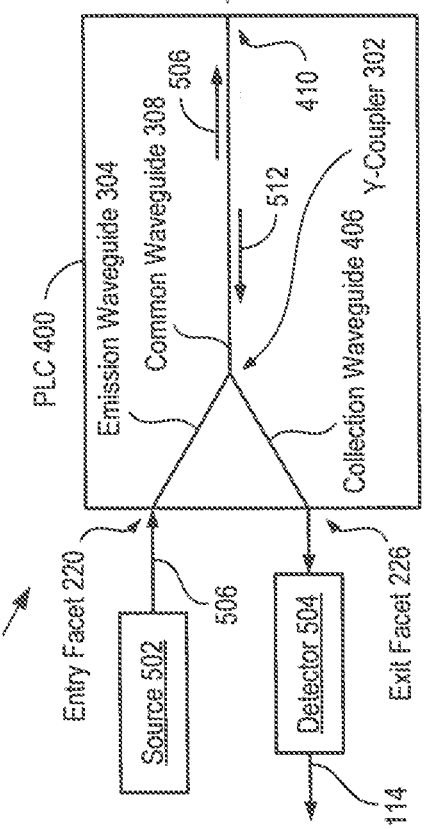

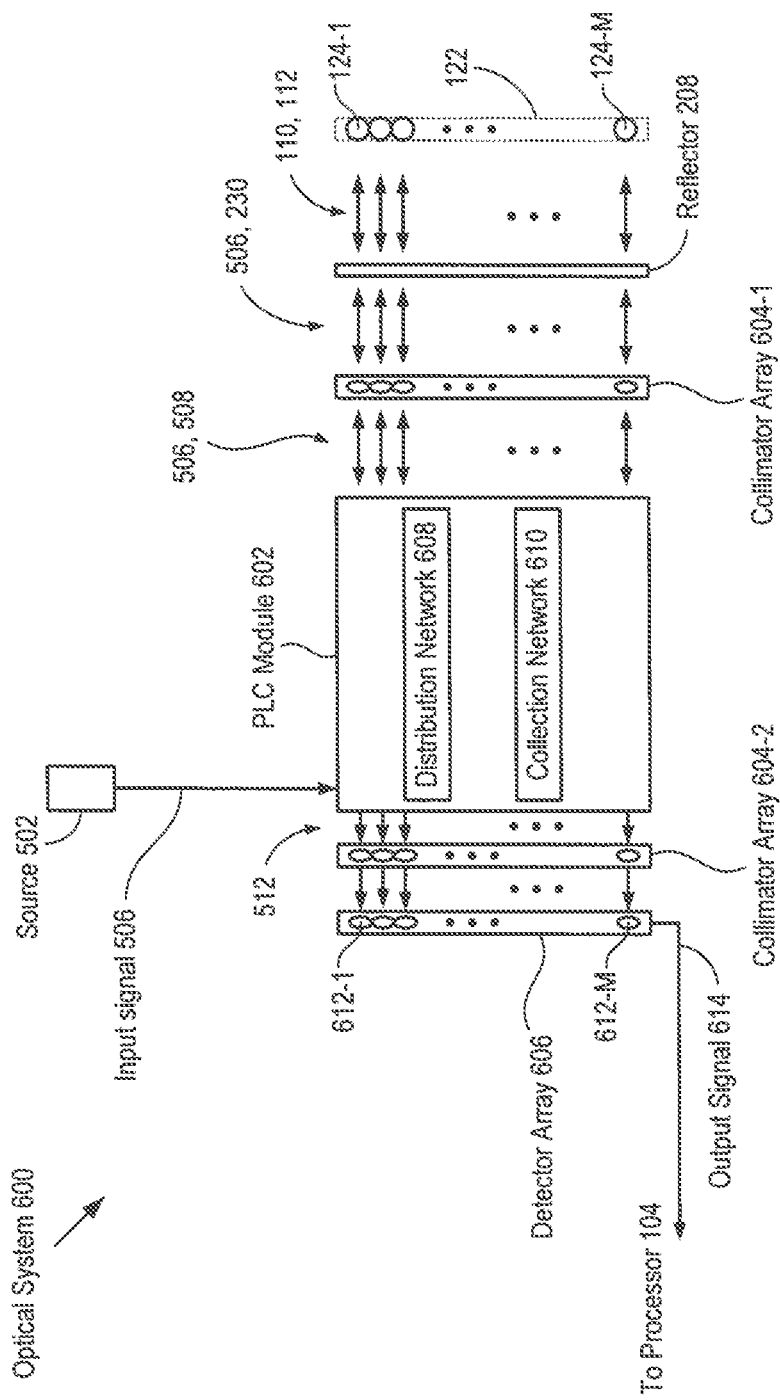

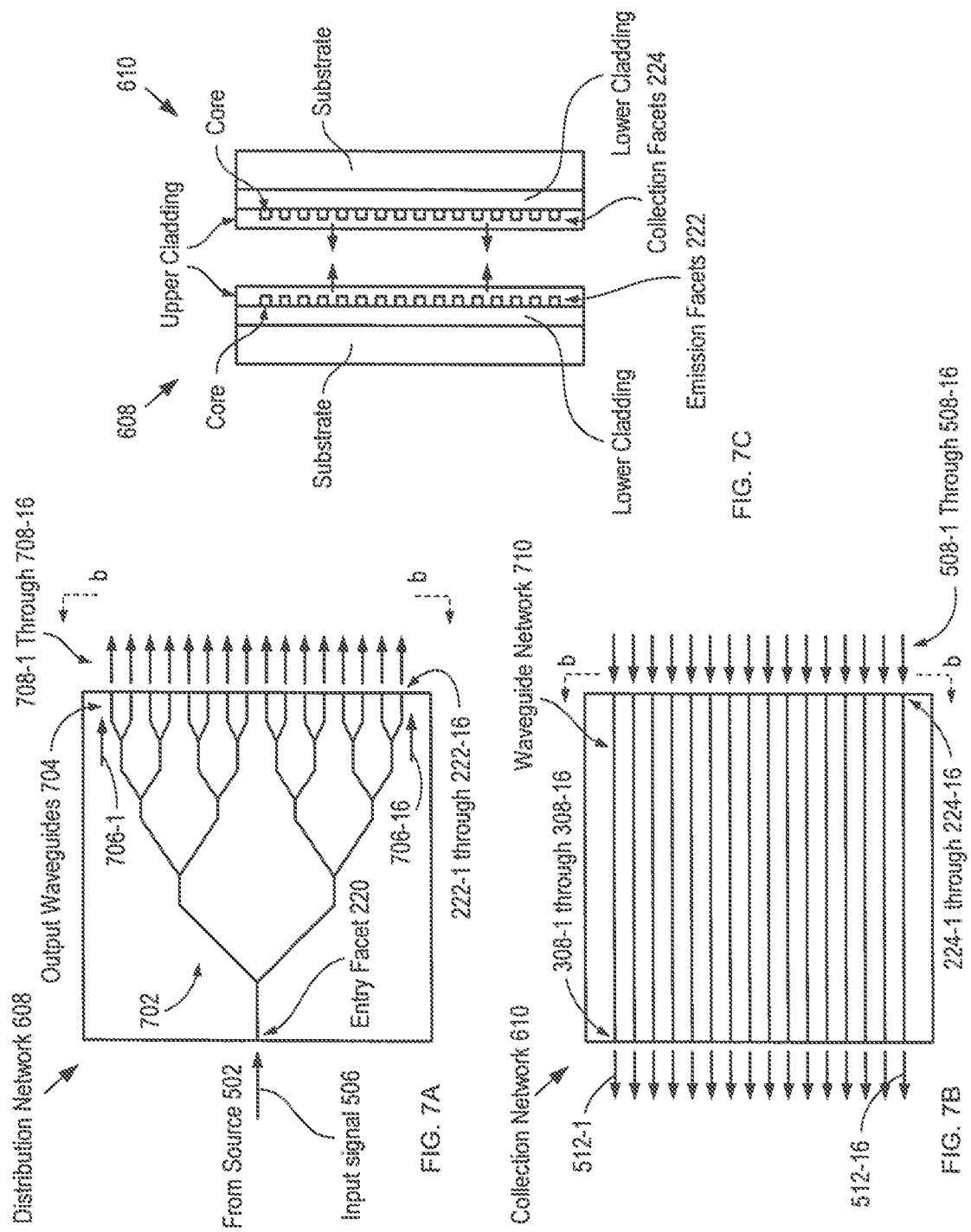

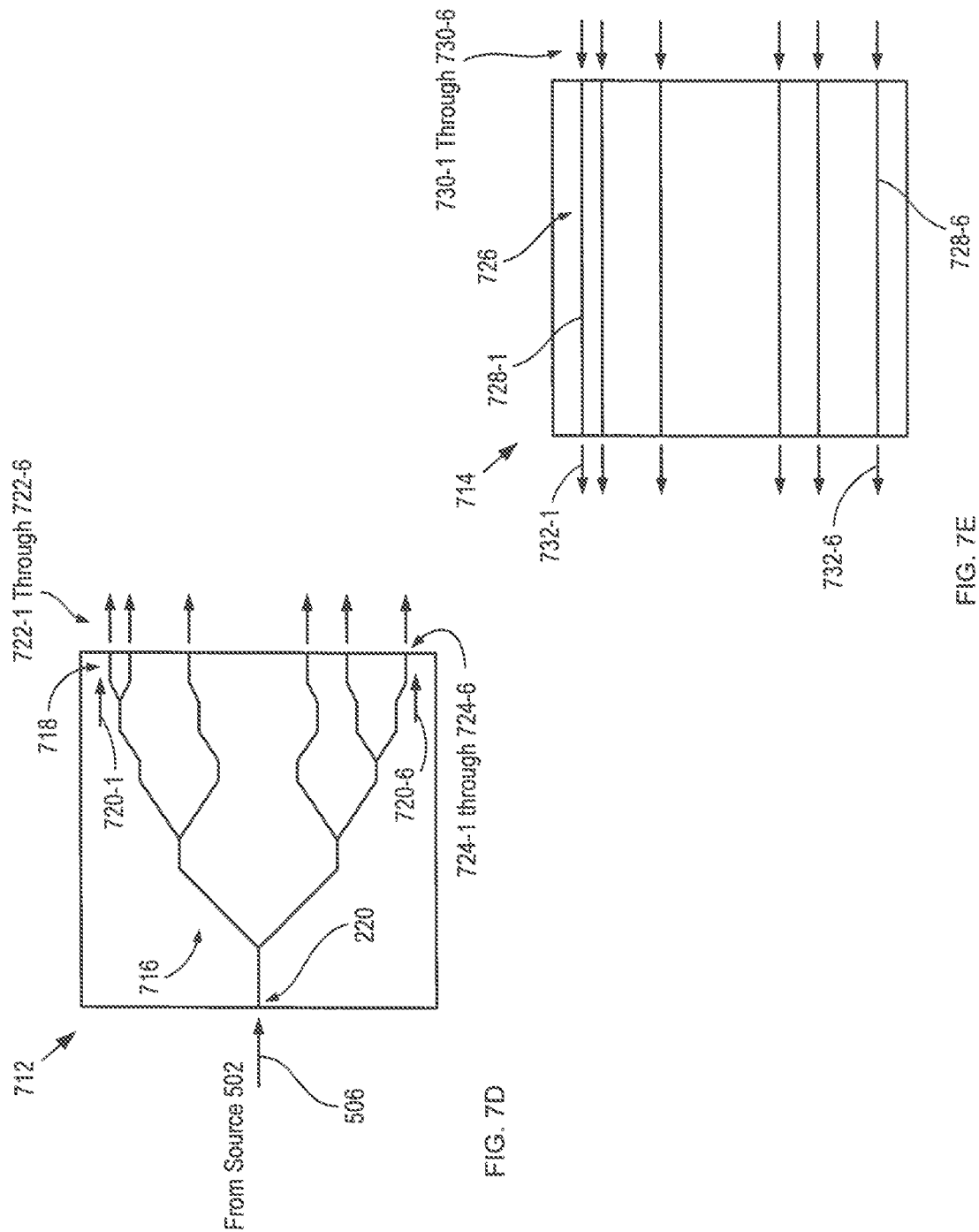

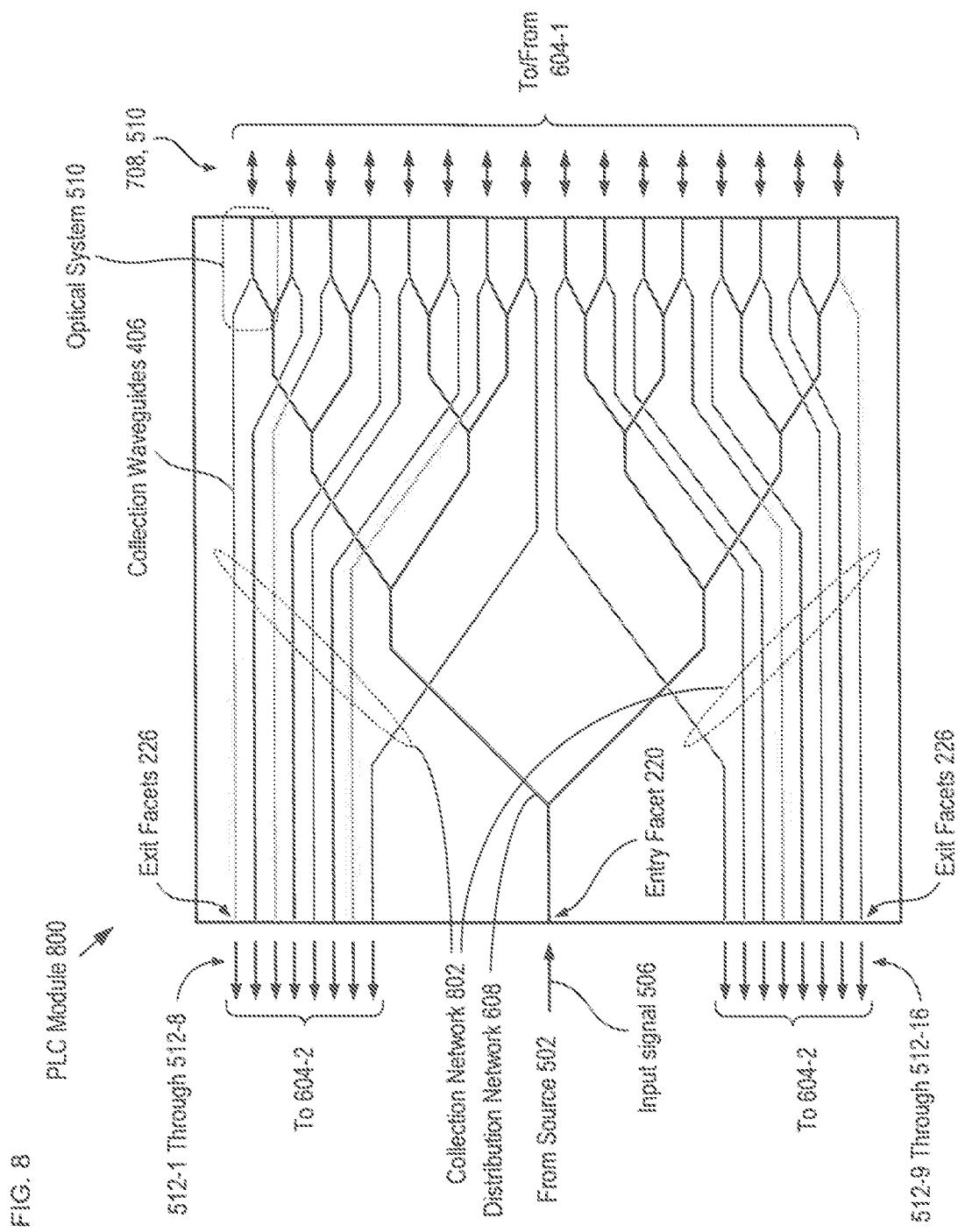
FIG. 8    PLC Module 800

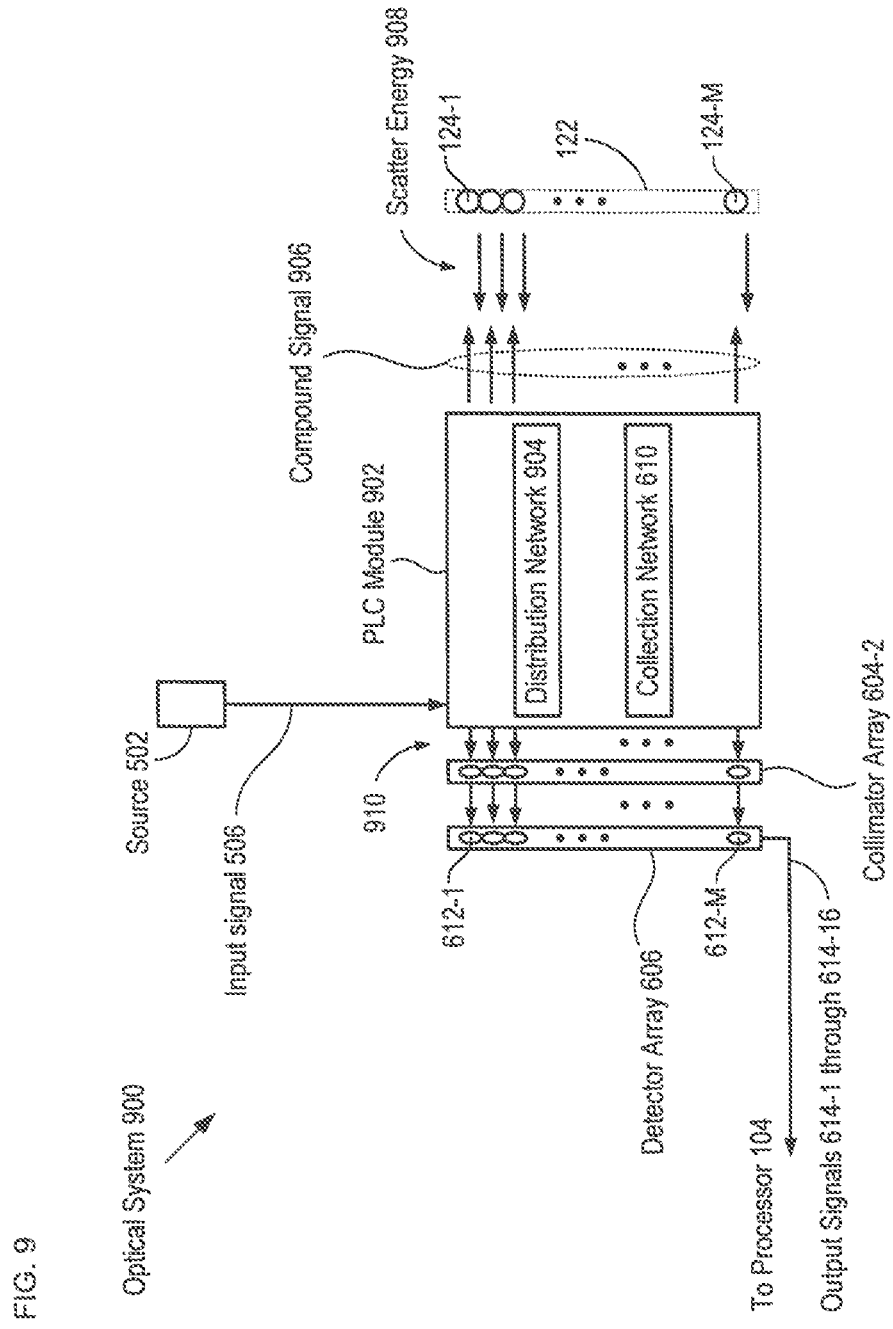

Distribution Network 904

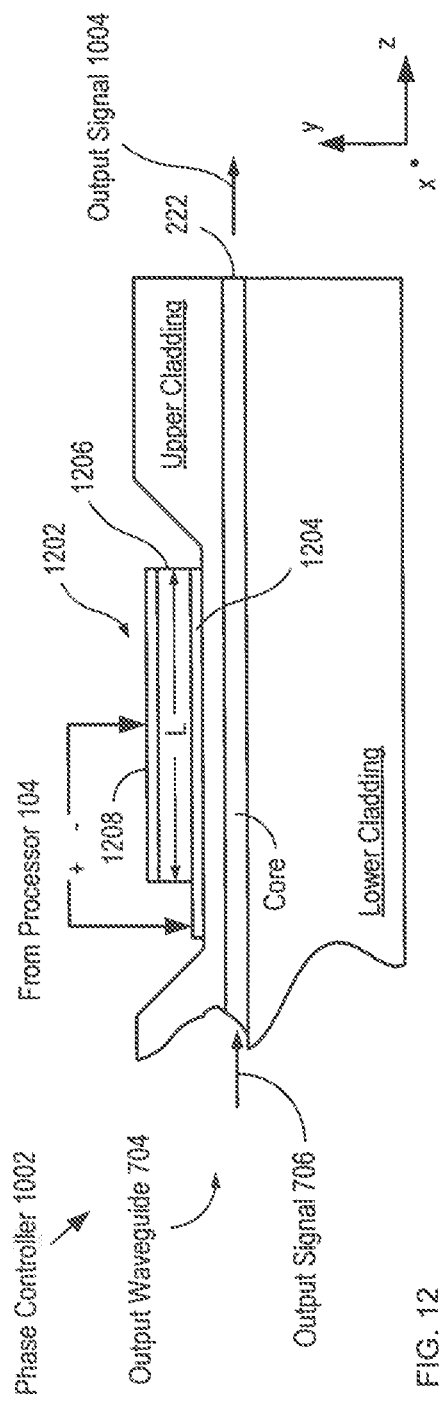
FIG. 12
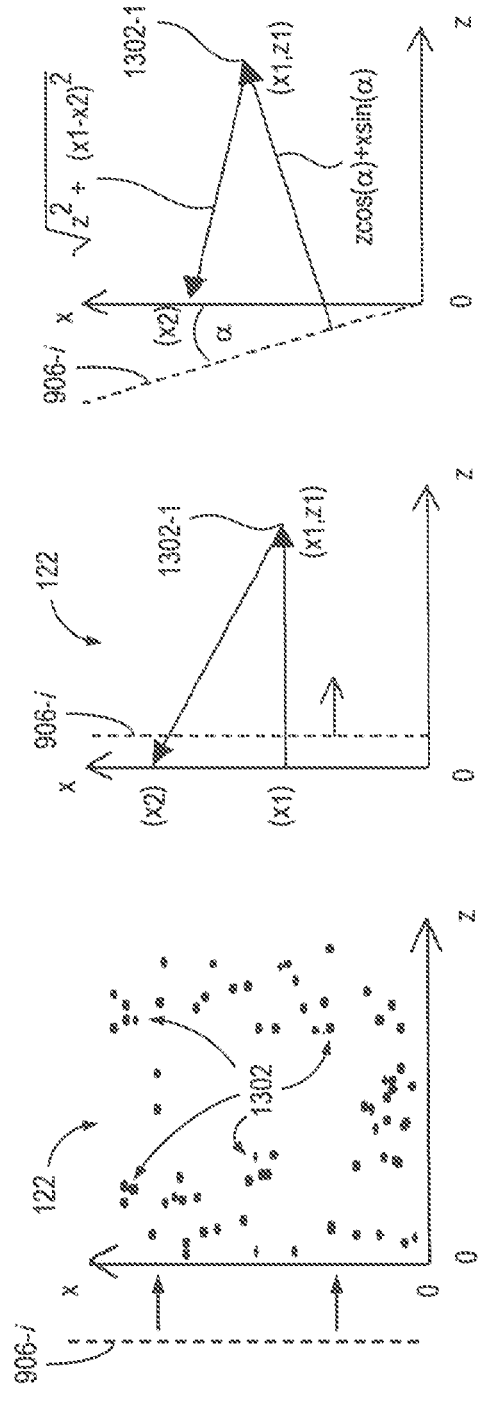
FIG. 13A
FIG. 13B
FIG. 13C

COMMON-PATH INTEGRATED LOW COHERENCE INTERFEROMETRY SYSTEM AND METHOD THEREFOR

FIELD OF THE INVENTION

The present invention relates to sub-surface imaging in general, and, more particularly, to low coherence interferometry imaging, such as optical coherence tomographic, optical frequency domain imaging, and optical coherence reflectance imaging.

BACKGROUND OF THE INVENTION

The ability to detect and image structure that is below the surface of a sample is desirable in many applications. For many years, x-ray imaging was the most widely used method of imaging sub-surface structure; however, x-ray imaging has many drawbacks—particularly in medical applications—such as poor image resolution and increased risk of cancer from large-dose and/or cumulative exposure. These drawbacks have fueled development of alternative sub-surface imaging methods, such as optical coherence tomography (OCT).

OCT has rapidly become a critical diagnostic tool in areas such as biological, biomedical, medical screening, and vision-care. It utilizes low-coherence optical interferometry to enable non-invasive imaging of micron-scale microstructure inside biological tissue without subjecting the tissue to damaging ionizing radiation. In addition, its relatively low cost, high-resolution, and in-vivo capabilities make it an increasingly attractive imaging method. In the vision-care arena, for example, OCT is used to non-invasively image the human eye fundus, thereby facilitating diagnosis of retinal pathologies, such as macular degeneration, glaucoma, retinitous pigmentosa, and the like.

Early OCT systems were time-domain systems based on a relatively simple implementation of a free-space Michelson interferometer, in which an input light signal is split into a reference arm and a sample arm. In the reference arm, light is directed toward a movable reference mirror, which continuously reflects light back toward the detector as the mirror is moved along a scan length. The instantaneous length of the reference arm depends on the instantaneous position of this mirror. In the sample arm, light is directed into the sample at a first object point. Light is reflected back from the object point only by structural discontinuities, such as sub-surface structural features. The return signals from the reference and sample arms are combined at a beam combiner to form a signal that generates an interference pattern at a detector. Light that travels the same length in each of the reference arm and sample arm constructively recombines to form high-intensity signals that correspond to the depths of surface and sub-surface structural features at the first object point. This one-dimensional axial scan of the depth of an individual object point is typically referred to as an "A-scan." By performing an A-scan at each of a plurality of object points, two- or three-dimensional images of the structure of the sample can be developed.

Unfortunately, while early time-domain OCT techniques were promising, their complexity and time-intensive nature served to limit their widespread adoption. As a result, alternative Fourier-domain OCT approaches were developed including Swept-source OCT (SS-OCT) and spectral-domain OCT (SD-OCT), which enable faster imaging with improved sensitivity.

In SS-OCT, the interferometric signal is sampled by a detector as a function of wavelength rather than mirror position. Typically, an object point in a sample is interrogated with a light source that sweeps through a range of optical frequencies (i.e., a swept source). As a result, the object point is illuminated with a beam of monochromatic light whose optical frequency is a function of time. This results in an interferometric signal of intensity versus wavenumber, k (k is proportional to the inverse of wavelength). A mathematical algorithm, referred to as a Fourier transform, is then used to convert the interferometric signal to a plot of intensity versus depth.

In SD-OCT, an object point is interrogated with broad-spectrum light. Light reflected from the object point is dispersed by wavelength along a row of detectors, which simultaneously provide a different output signal for each of a plurality of wavelength components. As a result, information is collected from many depths within the object point at the same time, and a Fourier-transform operation can be used to convert this information into a plot of intensity versus depth.

Historically, the interferometer portion of most OCT systems is based on bulk optics, fiber optics, or a combination of the two, making such OCT systems relatively large and expensive. Interferometers based on integrated optics offer a way to reduce the size and cost of OCT systems, however.

Integrated optics is a well-known technology wherein optical waveguides are formed on the surface of a substrate. These "surface waveguides" typically include a core or a first material that is surrounded by a second material having a refractive index that is lower than that of the first material. The change in refractive index at the interface between the materials enables reflection of light propagating through the core, thereby guiding the light along the length of the waveguide. Arrangements of surface waveguides, commonly referred to as planar lightwave circuits (PLCs), enable routing of optical signals within a small area, as well as complex optical functionality that can be difficult to achieve in free-space or fiber-optic-based systems.

Examples of OCT systems comprising PLC-based interferometers are described by Akca, et al., in "Toward Spectral-Domain Optical Coherence Tomography on a Chip," IEEE J. of Sel. Topics in Quantum Elect., Vol. 18, pp. 1223-1233 (2012) and "Miniature spectrometer and beam splitter for an optical coherence tomography on a silicon chip," Optics Express, Vol. 21, pp. 16648-16656 (2013), by Nguyen, et al., in "Integrated-optics-based swept-source optical coherence tomography," Optics Letters, Vol. 36, pp. 1293-1295 (2011) and "Optical coherence tomography imaging with an integrated optics spectrometer," Optics Letters, Vol. 37, pp. 4820-4822 (2012), and by Yurtsever, et al., in "Ultra-compact silicon photonic integrated interferometer for swept-source optical coherence tomography," Optics Letters, Vol. 39, pp. 5228-5231 (2014).

While these PLC-based interferometers enable OCT systems that are significantly smaller than bulk-optic-based OCT systems, they require components (e.g., directional couplers, etc.) that have significant wavelength dependence. This can degrade system performance and reduce signal-to-noise ratio (SNR) and/or contrast-to-noise ratio (CNR). Further, the Michelson or Mach-Zehnder interferometer arrangements described typically exhibit large chromatic dispersion and polarization mismatches between their sample and reference arms. While these mismatches can be compensated in optical-fiber-based interferometer systems, compensating them in a PLC-based system can be quite challenging.

As a result, there remains a need for a PLC-based approach to sub-surface imaging that enables good system performance without significant wavelength dependency.

SUMMARY OF THE INVENTION

The present invention enables low-cost, compact, integrated sub-surface imaging systems having improved performance over sub-surface imaging systems known in the prior art. Embodiments of the present invention are particularly well suited for use in low coherence interferometry applications such as optical coherence tomography, optical coherence reflectometry, optical frequency domain imaging, and the like.

Embodiments of the present invention are sub-surface imaging systems that include a common-path interferometer based on integrated-optics technology. In contrast to PLC-based interferometers of the prior-art, embodiments of the present invention are implemented without the inclusion of highly wavelength-sensitive integrated-optics components. As a result, interferometers in accordance with the present invention exhibit reduced wavelength dependence compared to PLC-based interferometers of the prior art. Further, the common-path interferometer arrangement of the present invention avoids polarization and wavelength dispersion effects that plague prior-art PLC-based interferometers based on either Michelson interferometer or Mach-Zehnder interferometers.

An illustrative embodiment of the present invention is an SD-OCT system comprising a source, a PLC-based interferometer, a scanning mirror, a reflector suitable for use as a reference surface, and a detector. The interferometer is arranged in a common-path arrangement that includes separate paths for downstream (i.e., excitation) light and upstream (i.e., back-reflected) light. As a result, there is no need for a directional coupler to split the input light into separate reference and sample arms and the reference signal and sample signal of the interferometer share a common path through the PLC. In addition, light reflected by the sample is conveyed directly to the detector by the collection waveguide, again obviating the need for a circulator or directional coupler. By avoiding the use of directional couplers and/or circulators, sensitivity to wavelength is mitigated.

In the illustrative embodiment, the source comprises a wide-band super-luminescent light-emitting diode, the collection waveguide includes a miniature spectrometer for spatially dispersing the wavelength components of the reflected light signal onto a one-dimensional array of photodetectors included in the detector. In some embodiments, the source is a swept-source that repeatedly sweeps a narrow-wavelength sample signal through a range of wavelengths. In such embodiments, a spectrometer is not required, since the spectrum of the light source is sequentially scanned in time. As a result, these embodiments require only a single, high-speed photodetector. In some embodiments, the detector includes two high-speed photodetectors in a balanced detection configuration.

In some embodiments the reflector is characterized by a graded reflectivity along one dimension and whose position relative to the sample signal is controlled to control the amount of light reflected in the upstream direction by the reference surface.

In some embodiments, the interferometer includes an integrated-optics chip having a y-splitter joined with a single path for upstream and downstream light, where the y-splitter optically couples each of the source and detector to the single path.

An embodiment of the present invention comprises a plurality of common-path interferometers that simultaneously interrogate a plurality of object points on a sample. Each interferometer includes at least one surface waveguide of a PLC module. In some embodiments, the PLC module includes a distribution network of surface waveguides that distributes an input optical signal into a plurality of free-space optical signals. Each free-space optical signal is incident on a reflector that distributes its energy into a reference signal and a sample signal that is directed toward a different object point. The interaction of each sample signal and its respective object point gives rise to a scatter signal, which is combined with its corresponding reference signal and coupled into a surface waveguide of the PLC module as an interferometric signal. Each interferometric signal includes wavelength signals that are based on the structural features of its respective object point. The wavelength signals or each interferometric signal are detected and used to generate an A-scan of its respective object point. In some embodiments, the surface waveguides of the distribution network are arranged in a sparse arrangement that defines a non-linear ruler. In some of these embodiments, the reference signals and scatter signals are received at a collection network of the PLC module, where the collection network includes a plurality of surface waveguides that are arranged to define a non-linear ruler that matches that of the distribution network.

In some embodiments, a PLC module includes a distribution network of surface waveguides and a collection network of surface waveguides. The distribution network provides a plurality of sample signals that collectively define a composite sample signal, such as a plane wave. The phase of each of the plurality of sample signals is controlled by a phase controller to define the shape and/or propagation direction of the composite sample signal. The composite sample signal is directed toward a region of a sample, which scatters it into scatter energy that is based on the structural features in the region. The scatter energy is coupled into the surface waveguides of the collection network as a plurality of scatter signals, which are then provided to a plurality of detector elements, each of which provides an output signal to a processor, which generates an estimate of the structure of the sample region based on the plurality of output signals. In some embodiments, the phases of the plurality of sample signals is changed multiple times to interrogate the sample region with different composite sample signals. This enables the processor to generate a compound estimate of the structural features of the sample region, thereby improving the accuracy of the estimate.

An embodiment of the present invention is a low coherence interferometry (LCI) system for forming an image of a sample, the LCI system comprising an optical system that is operative for interrogating a first object point of the sample with a first sample signal, the optical system comprising; a source for providing an input optical signal; a planar lightwave circuit (PLC) module that is operative for receiving the input optical signal and providing a first optical signal that is based on the input optical signal, the PLC module including a first surface waveguide having a first facet; and a reflector that is dimensioned and arranged to distribute the first optical signal into a first reference signal and the first sample signal; wherein the source, PLC module, and reflector collectively define a portion of a first interferometer that is a common-path interferometer in which the first reference signal and the first sample signal share a common path that includes at least one surface waveguide included in the PLC module; and wherein the PLC module, the reflector, and the sample are arranged such that the first facet couples the first reference signal and a first scatter signal into the first surface waveguide as a first interferometric signal, the first scatter signal including a first plurality of wavelength signals that is based on the first sample signal and at least one structural feature of the first object point.

Another embodiment of the present invention is an optical system for forming an image of a sample, the LCI system comprising: (1) a source for providing an input optical signal; and (2) a planar lightwave circuit (PLC) module including: (I) a distribution network that includes a first plurality of surface waveguides that is dimensioned and arranged to receive the input optical signal at an input facet and distribute it into a plurality of first optical signals at a plurality of emission facets, wherein the plurality of first optical signals collectively defines a composite optical signal, and wherein the distribution network is operative for controlling the phase of at least one of the plurality of first optical signals, and further wherein at least one of the shape and propagation direction of the composite optical signal is based on the phase of the at least one of the plurality of first optical signals; and (II) a collection network that includes a second plurality of surface waveguides having a plurality of collection facets that is dimensioned and arranged to couple optical energy received from the sample into the second plurality of surface waveguides as a plurality of scatter signals; wherein the optical energy received from the sample is based on the composite optical signal and at least one structural feature of the sample.

Another embodiment of the present invention is a method for forming an image or a sample, the method comprising: providing a planar lightwave circuit (PLC) module that includes a first surface waveguide having a first facet, wherein the PLC module receives an input optical signal and provides a first optical signal that is based on the input optical signal; providing a reflector that is partially transmissive for the first optical signal, wherein the PLC module and the reflector are arranged to collectively define at least a portion of a first common-path interferometer having a first common path for a first reference signal and a first sample signal, and wherein the reflector receives the first optical signal from the PLC module; distributing the first optical signal into the first reference signal and the first sample signal at the reflector; interrogating a first object point of the sample with the first sample signal to generate a first scatter signal having a first plurality of wavelength signals that is based on the first sample signal and at least one structural feature of the first object point; coupling each of the first reference signal and the first scatter signal into the first surface waveguide at the first facet to form a first interferometric signal that includes the first plurality of wavelength signals; and generating a first output signal based on the first plurality of wavelength signals.

BRIEF DESCRIPTION OF THE DRAWINGS

FIGS. 5A-B depict examples of SS-OCT systems based on PLC modules 302 and 400, respectively.

FIG. 5C depicts input signal 506.

FIG. 6 depicts a schematic drawing of a multi-signal LCI system in accordance with a first alternative embodiment of the present invention.

FIG. 7A depicts a schematic drawing of distribution network 608.

FIG. 7B depicts a schematic drawing of collection network 610.

FIG. 7C depicts an exploded side view of PLC module 602.

FIGS. 7D and 7E depict schematic drawings of a distribution network and collection network, respectively, in accordance with an alternative embodiment of the present invention.

FIG. 8 depicts an alternative PLC module suitable for use in the first alternative embodiment of the present invention.

FIG. 9 depicts a schematic drawing of a multi-signal LCI system in accordance with a second alternative embodiment of the present invention.

FIG. 12 depicts a schematic drawing of a cross-sectional view of a phase-controller in accordance with the second alternative embodiment of the present invention.

FIG. 13A depicts a schematic drawing of scan region 122 during its interrogation with plane wave 906-$i$, where plane wave 906-$i$ is substantially normal to surface 126 (i.e., $\theta_i$=0).

FIG. 13B depicts the propagation path for energy of plane wave 906-$i$ scattered by a representative structural feature 1302-1 located at position ($x_1$,$z_1$) within scan region 122.

FIG. 13C depicts the propagation path for energy of a plane wave 906-$i$, tilted at an angle, $\alpha$, as it is scattered by a representative structural feature 1302-1 located at position ($x_1$,$z_1$) within scan region 122.

DETAILED DESCRIPTION

Figure 1A:
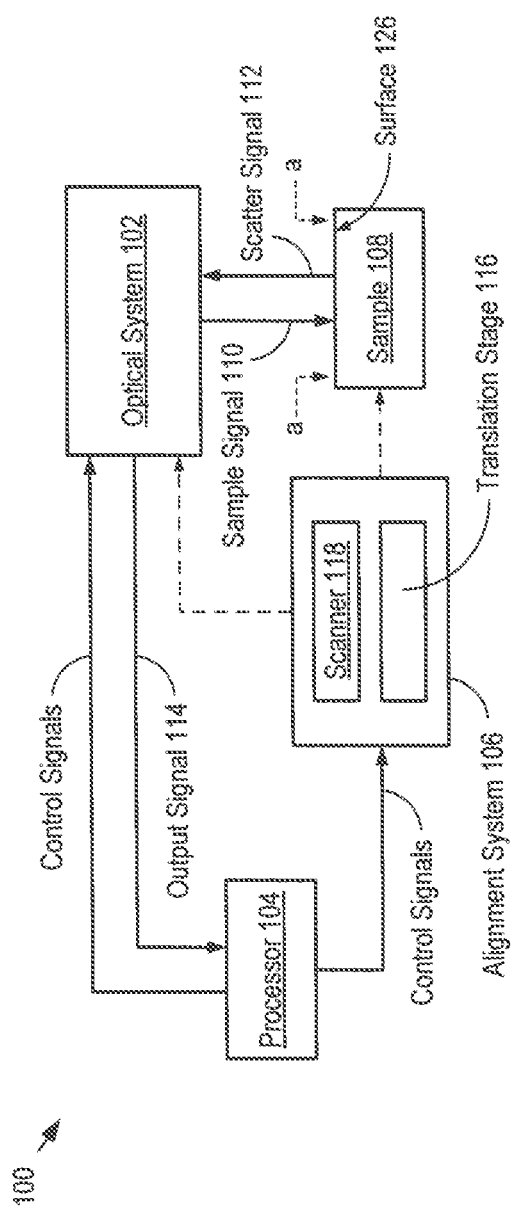
FIG. 1A depicts a schematic drawing of an imaging system in accordance with an illustrative embodiment of the present invention.

FIG. 1A depicts a schematic drawing of an imaging system in accordance with an illustrative embodiment of the present invention. System 100 is a low-coherence interferometry system comprising optical system 102, processor 104, and alignment system 106. System 100 is an OCT system that is operative for generating a three-dimensional image of the structure of a sample region.

It should be noted that low coherence interferometry (LCI) encompasses several types of imaging approaches, including optical coherence tomography (OCT), optical coherence reflectometry, partial coherence reflectometry, optical frequency domain imaging, and the like, all of which have substantially the same basic measurement set-up that includes an interferometer operated under low-coherence illumination. LCI systems have been researched and applied to different fields, including medical imaging, measuring electric or magnetic field, pressure, acceleration, fluid flow, etc., with OCT systems being the most ubiquitous among LCI systems. Although the illustrative embodiment is an OCT system, it will be clear to one skilled in the art, after reading this Specification, how to specify, make, and use alternative embodiments of the present invention that embody a different LCI approach, such as optical coherence reflectometry.

Figure 1B:
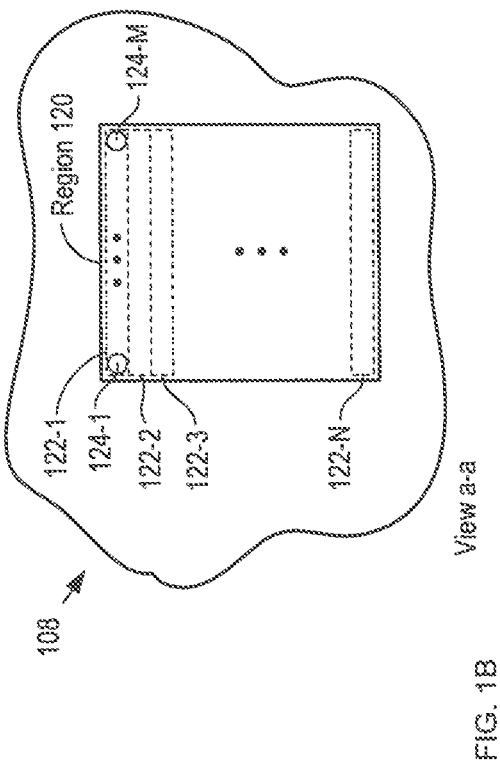
FIG. 1B depicts a schematic drawing of a top view of a region of a sample under test (i.e., sample 108).

FIG. 1B depicts a schematic drawing of a top view of a region of a sample under test (i.e., sample 108). FIG. 1B depicts a view of surface 126 of sample 108 taken through view a-a of FIG. 1A. Region 120 includes scan regions 122-1 through 122-N. Each of scan regions 122-1 through 122-N (referred to, collectively, as scan regions 122) includes M object points 124 (i.e., object points 124-1 through 124-M) and has a size substantially equal to the area of a B-scan performed by optical system 102, as discussed below and with respect to FIG. 2. The area of each of scan regions 122 is defined in one dimension by the diameter of the signal used to interrogate each object point (i.e., the size of an A-scan) and, in the other dimension, by the distance along which sample signal 110 is scanned.

Optical system 102 is the integrated-optics-based (i.e., PLC-based) optical engine of a spectral-domain optical coherence tomography (SD-OCT) system. Optical system 102 is described in detail below and with respect to FIG. 2.

Processor 104 is a conventional processing system capable of, among other things, controlling the alignment between optical system 102 and alignment system 106 to enable the interrogation of each object point within region 120, processing the output signals generated by the interrogation of the object points, and developing a structural image of the region based on the processed output signals.

Alignment system 106 comprises translation stage 116 and scanner 118, which collectively control the relative positions of optical system 102 and sample 108.

Translation stage 116 is a conventional translation stage operative for aligning optical system 102 with each of scan regions 122-1 through 122-N in response to control signals from processor 104.

Scanner 118 is a single-axis rotating mirror operative for scanning sample signal 110 along the length of a scan region to enable optical system 102 to interrogate each object point 124 within the scan region. In some embodiments, scanner 118 includes a different scanning element suitable for sweeping light along a path on sample 108. Scanners suitable for use in the present invention include, without limitation, one- or two-axis scanning mirrors, one- or two-axis MEMS mirrors, one- or two-axis mirror galvanometers, and the like.

In operation, translation stage 116 sequentially aligns optical system 102 with each of the N scan regions 122 in region 120. While optical system 102 is aligned with a scan region, scanner 118 scans sample signal 110 across the width of the scan region to sequentially interrogate each of its M object points 124. After scanning all of the object points in a scan region, translation stage 116 indexes the relative positions of the optical system and sample to enable interrogation of the next scan region. This process is repeated until optical system 102 has interrogated all of the M×N object points 124 in region 120.

One skilled in the art will recognize that the combination of the translation stage and scanner of alignment system 106 represents merely one example of a system suitable for aligning optical system 102 and sample 108, and that myriad alternatives exist within the scope of the present invention, such as scanning mirrors for changing the optical path between them, multi-axis translation stages, multi-degree-of-freedom alignment stages, manual positioning of one or both of the optical system and sample, and the like. In some embodiments, scanner 118 is not included and sample signal 110 propagates from optical system 102 directly to the object point under test directly (typically through one or more intervening lenses).

It is an aspect of the present invention that employing an optical system comprising an integrated-optics-based common-path interferometer affords embodiments of the present invention with significant advantage over LCI imaging systems of the prior art. For the purposes of this Specification, including the appended claims, a "common-path interferometer" is defined as an interferometer arrangement wherein the sample and reference arms share the same optical path. While common-path interferometer-based OCT systems are known in the prior art, the challenges associated with implementing them in an integrated-optics platform are significant. Specifically, the high propagation loss associated with surface waveguides (as compared to fiber optics), a lack of mature key integrated-optics components, such as broadband splitters and circulators, have heretofore made PLC-based, common-path interferometers impractical. As a result, to date, PLC-based OCT systems have been based on only Michelson or Mach-Zehnder interferometers and common-path interferometer-based OCT systems have not been pursued.

It is an aspect of the present invention, however, that practical common-path interferometers can be implemented in an integrated-optics platform by employing uncommon alternative circuit layouts that exclude wavelength-sensitive waveguide elements and immature waveguide elements in the optical path of the interferometer. Further, in addition to mitigating problems inherent in prior-art LCI imaging systems, embodiments of the present invention that are free of wavelength-sensitive components are suitable for use in virtually any LCI system, including broadband implementations (e.g., SD-OCT systems) and swept-wavelength implementations (e.g., SS-OCT systems). This represents a significant advantage over prior-art interferometer arrangements that include directional couplers, which typically have coupling characteristics that vary dramatically for different wavelengths.

Figure 2:
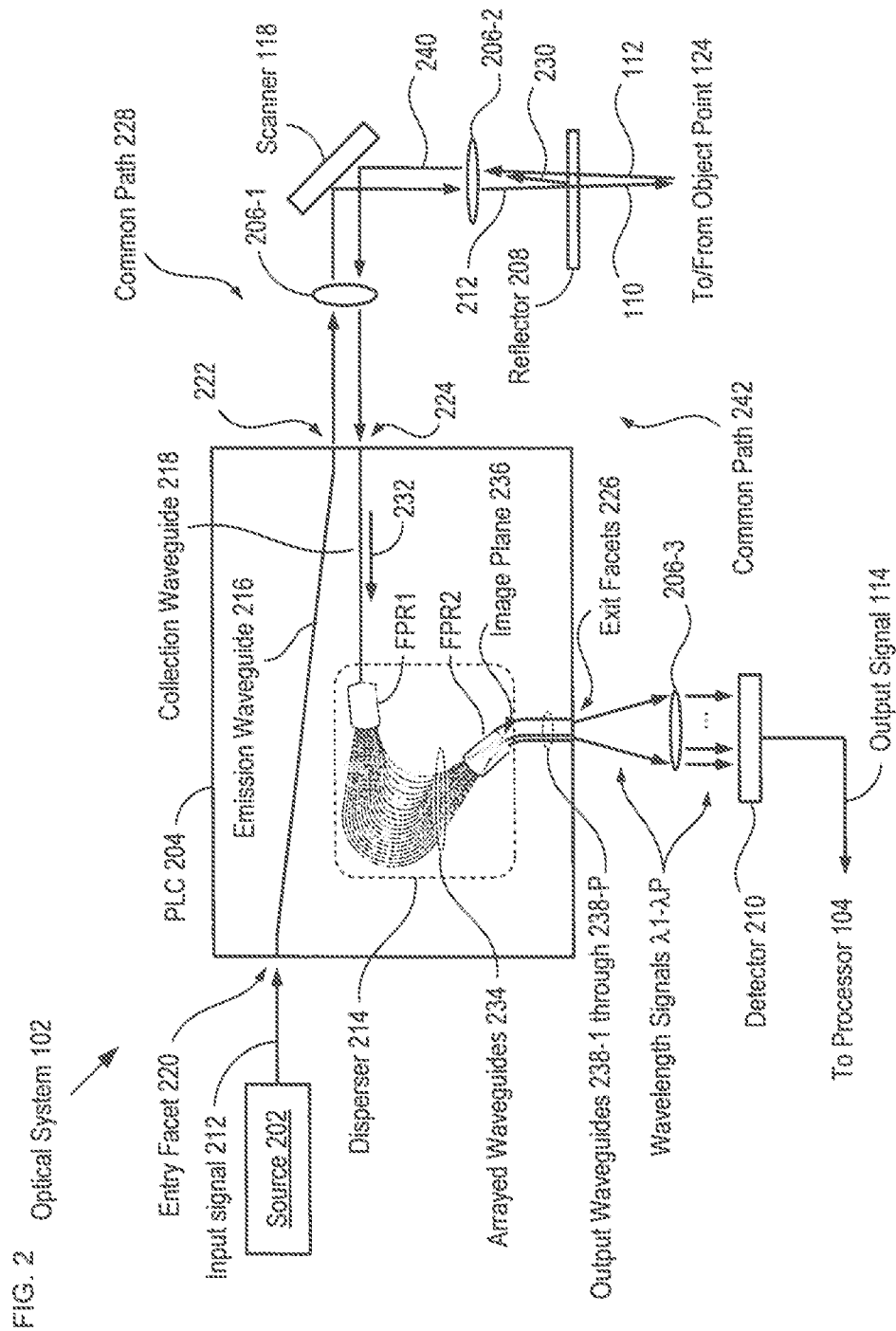
FIG. 2 depicts a schematic drawing of an optical system in accordance with the illustrative embodiment.

FIG. 2 depicts a schematic drawing of an optical system in accordance with the illustrative embodiment. Optical system 102 includes source 202, planar lightwave circuit module 204, lenses 206-1 through 206-3, reflector 208, and detector 210, which are arranged to define a common-path interferometer suitable for SD-OCT.

Source 202 is a broadband light source comprising a super-luminescent light-emitting diode (LED) that is optically coupled with PLC module 204. Source 202 provides input signal 212 such that it has a continuous wavelength range that is wide enough to enable a desired axial resolution. In the illustrative embodiment, the wavelength range of input signal 212 is centered at approximately 1300 nanometers (nm) and has a full-width-at-half-maximum (FWHM) of approximately 40 nm. In some embodiments, source 202 provides an input signal having a different center wavelength and/or a different FWHM. In some embodiments, source 202 is a conventional broadband light source other than a superluminescent LED.

Source 202 is optically coupled with entry facet 220 to launch input signal 212 into PLC module 204. In some embodiments, an optical isolator is included as part of source 202, or between source 202 and PLC module 204, to mitigate coupling of back-reflections or other light signals into the source.

PLC module 204 is an integrated-optics chip comprising an arrangement of channel-type surface waveguides that includes emission waveguide 216, collection waveguide 218, disperser 214, and output waveguides 238-1 through 238-P. In some embodiments, PLC module 204 includes more than one integrated-optics chip. Emission waveguide 216 includes entry facet 220 and emission facet 222. Collection waveguide 218 includes collection facet 224 and exit facets 226. Emission waveguide 216 and collection waveguide 218 are arranged such that they emit and collect light along divergent directions at emission facet 216 and collection facet 218. In some embodiments, the waveguides and/or their facets are not tailored to mitigate coupling of light into emission waveguide 216. It should be noted that the arrangement of the emission and collection waveguides, emission facet, and collection facet is dependent upon the entirety of optical system 102; therefore, their dimensions, spacing, and orientation are matters of design choice for each embodiment of the present invention. For the purposes of this Specification, including the appended claims, the term "surface waveguide" is defined as an optical waveguide that includes a core of a first material that is at least partially surrounded by a second material having a refractive index that is lower than that of the first material, where the change in refractive index at the interface between the core and its surrounding materials enables reflection of light propagating through the core, thereby guiding the light along the length of the surface waveguide. As used herein, the term surface waveguide is meant to include other commonly used names for integrated-optics-based waveguides, such as waveguides, channel waveguides, ridge waveguides, box waveguides, and the like.

Each of emission waveguide 216 and collection waveguide 218 comprises a surface waveguide structure suitable for conveying input signal 212 with little propagation loss. One skilled in the art will recognize, after reading this Specification, that the specific design of the channel waveguides, as well as their constituent materials, is dependent upon the wavelengths included in input signal 212, among other factors. Materials suitable for use in PLC module 204 include, without limitation, silicon oxides, silicon nitrides, silicon oxynitrides, silicon, germanium, compound semiconductors, glasses, and the like. Further, although the illustrative embodiment comprises surface waveguides that are channel waveguides, it will be clear to one skilled in the art, after reading this Specification, how to specify, make, and use alternative embodiments wherein an integrated-optics chip includes at least one surface waveguide that is other than a channel waveguide. Surface waveguide structures suitable for use in embodiments of the present invention include, without limitation, ridge waveguides, stripe waveguides, multi-core waveguides (e.g., TriPleX waveguides as described in U.S. Pat. No. 7,146,087, etc.), box-shape waveguides, and the like.

It should be noted that the use of separate waveguides for downstream and upstream light (i.e., emission waveguide 216 and collection waveguide 218) affords embodiments of the present invention with significant advantages over prior-art OCT and other LCI systems. Conventional design theory would dictate avoiding separating the paths for downstream and upstream light signals in the interferometer because such a design would typically have more optical loss. By separating these signal paths, however, the present invention enables avoidance of wavelength-dependent waveguide elements, such as directional couplers. By mitigating the wavelength dependency of the interferometer arrangement, noise due to chromatic dispersion is reduced, thereby providing system performance having improved SNR and CNR—even at the cost of weakened signal strength due to the additional loss. As a result, the present invention enables the use of integrated optics to reduce OCT system size and cost without some of the disadvantages of prior-art PLC-based OCT systems.

Emission waveguide 216 conveys the input signal to emission facet 222, where it is launched into free space and directed toward object point 124 by scanner 118 (via conventional lenses 206-1 and 206-2). As input signal 212 propagates toward the object point, it is incident on reflector 208, which reflects a first portion back as reference signal 230 and passes a second portion to object point 124 as sample signal 110.

Reflector 208 is a reflector whose position within optical system 102 remains fixed throughout the interrogation of each object point. In the illustrative embodiment, the reflectivity of reflector 208 is substantially uniform along the scan direction of the scanner; however, it has a substantially linear reflectivity gradient along a direction orthogonal to the scan direction of scanner 118. As a result, the intensity of sample signal 110 and scatter signal 112 to be controlled by moving reflector 208. This can be advantageous to, for example, avoid saturating detector 210 and/or ensure the wavelength signals received by the detector have intensities that provide high SNR.

At object point 124, sample signal 110 penetrates into the depth of the sample material, where wavelength signals in the sample signal are scattered by structural discontinuities in the object point as scatter signal 112. One skilled in the art will recognize that the wavelength signals in sample signal 110 represent different effective path lengths. As a result, the structural configuration of the object point is encoded in the spectral content of scatter signal 112.

Scatter signal 112 and reference signal 230 travel a common path through optical system 102. At lens 206-2, scatter signal 112 and reference signal 230 combine as return signal 240, which is then coupled into collection waveguide 218 at collection facet 224 to collectively define interferometric signal 232 whose wavelength components are based on the structure of the interrogated object point.

One skilled in the art will recognize that reference signal 230 is analogous to a reference signal provided by the reference arm of a conventional double-path interferometer, such as a Michelson or Mach-Zehnder interferometer. In similar fashion, sample signal 110 is analogous to a sample signal provided by the sample arm of a conventional double-path interferometer. In the downstream direction of optical system 102, however, reference signal 230 and sample signal 110 are portions of the same optical signal (i.e., input signal 212) and, therefore, inherently travel along the same path from entry facet 220 and reflector 208 (i.e., common path 228). Common path 228 includes emission waveguide 216 and the free-space optical path between emission facet 222 and reflector 208. Likewise, in the upstream direction of optical system 102, reference signal 230 and scatter signal 112 travel along the same path from reflector 208 to FPR1 (i.e., common path 242). Common path 242 includes the free-space path between reflector 208 and collection facet 222 and collection waveguide 218. The reference and sample signals of optical system 102, therefore, travel a common path that includes common paths 228 and 242. By employing common-path interferometer arrangements, embodiments of the present invention avoid the separate optical paths inherent to prior-art PLC-based OCT systems. As a result, in embodiments of the present invention, the sample and reference signals have substantially identical phase and group velocity, as well as matched polarization and chromatic dispersion. Further, by avoiding components such as directional couplers and circulators, embodiments of the present invention can have less wavelength dependency than integrated-optic-based OCT systems of the prior art.

Collection waveguide 218 conveys interferometric signal 232 from collection facet 224 to disperser 214.

Disperser 214 is a spectrometer comprising an array waveguide grating (AWG) that includes arrayed waveguides 234, which are located between free propagation regions FPR1 and FRP2. Light from collection waveguide 218 diverges in FPR1 and is coupled into the arrayed waveguides. The length difference between adjacent waveguides within arrayed waveguides 234 is an integer of the center wavelengths of wavelength signals $\lambda 1$ through $\lambda P$. As a result, the wavefront at the beginning of FPR2 is cylindrical and causes wavelength signals $\lambda 1$ through $\lambda P$ to be focused onto different locations on image plane 236 of FPR2, where each wavelength signal is coupled into a different one of output waveguides 238.

Although the illustrative embodiment comprises a disperser that includes an AWG, it will be clear to one skilled in the art, after reading this Specification, how to specify, make, and use alternative embodiments wherein disperser 214 includes a different wavelength dispersion element, such as a diffraction-grating-based miniature spectrometer, prism elements, and the like.

Output waveguides 238 convey the wavelength signals to exit facets 226, where they are launched into free space and provided to detector 210 via conventional lens 206-3.

For the purposes of this Specification, including the appended claims, disperser 214 and output waveguides 238 are defined as being located in the detection portion of optical system 102 and, therefore, are considered to be outside the optical path of the interferometer.

In some embodiments, image plane 236 is located at exit facets 226 and is imaged directly onto detector 210 using free-space optics. In such embodiments, output waveguides 238 are not included in PLC module 204.

Detector 210 is a conventional linescan camera suitable for detecting wavelength signals $\lambda 1$ through $\lambda P$. In some embodiments, detector 210 is another multi-element detector operative for providing a different output signal for each wavelength component in interferometric signal 232, such as a two-dimensional array of photodetectors or other suitable image sensors (e.g., charge-coupled devices CCDs, etc.). One skilled in the art will recognize that the overall spectral resolution of the imaging system is given as the combination of the detector-limited and the arrayed-waveguide-limited resolution.

Detector 210 provides output signal 114 to processor 104. Processor 104 processes these signals to generate an A-scan of the object point under test.

Upon completion of the interrogation of an object point, alignment system 106 realigns optical system 102 and sample 108 to enable interrogation of another object point in region 120. Once the interrogation of all M×N object points in region 120 (or a desired subset thereof) have been interrogated, processor 104 generates a three-dimensional image of the surface and sub-surface structure of the region.

In some embodiments, disperser 214 is not integrated into PLC module 204 but, rather is external to the integrated-optics chip.

Figure 3:
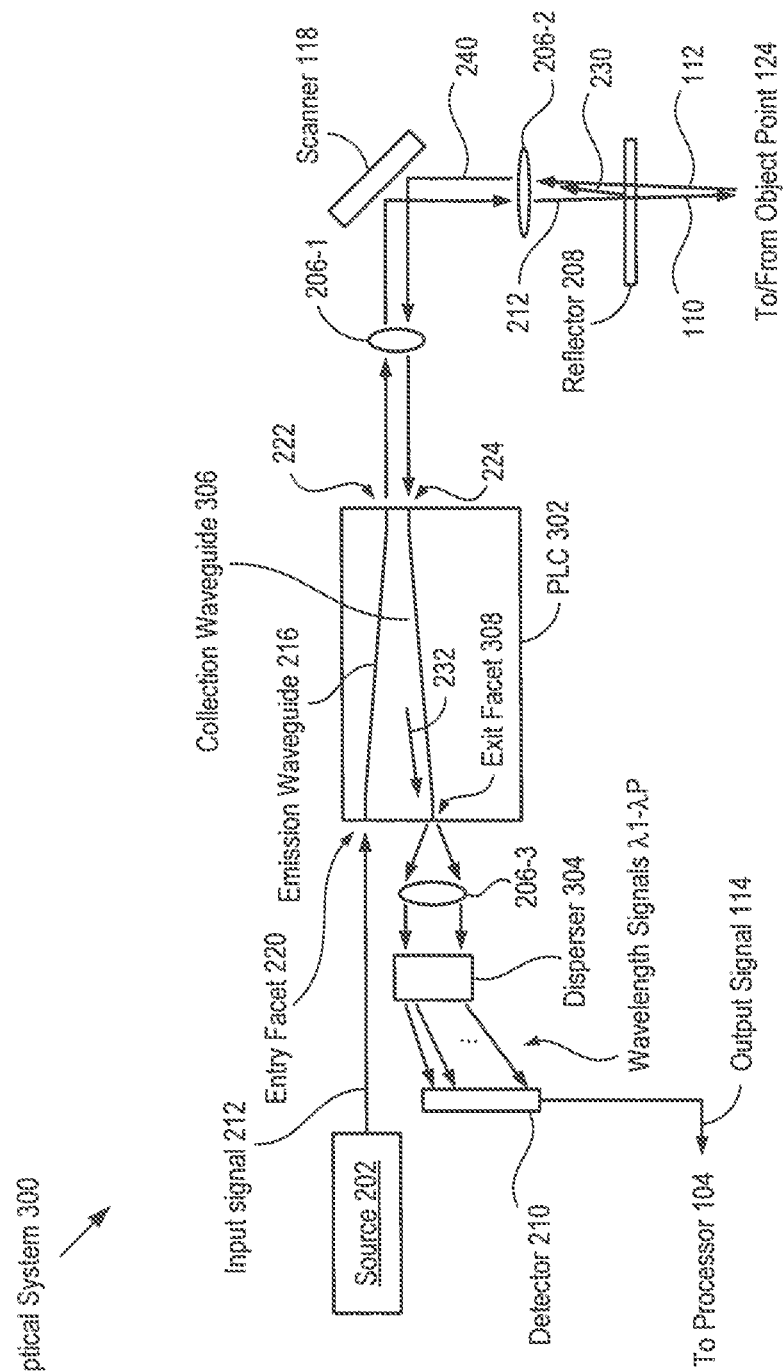
FIG. 3 depicts a schematic drawing of an alternative common-path, PLC-based optical system that includes a bulk-optics wavelength dispersion element.

FIG. 3 depicts a schematic drawing of an alternative common-path, PLC-based optical system that includes a bulk-optics wavelength dispersion element. Optical system 102 includes source 202, planar lightwave circuit module 302, lenses 206-1 through 206-3, reflector 208, disperser 304, and detector 210, which are arranged to define a common-path interferometer suitable for SD-OCT.

PLC module 302 is analogous to PLC module 204; however, PLC module 302 includes only emission waveguide 216 and collection waveguide 306.

As described above and with respect to FIG. 2, emission waveguide 216 conveys input signal 212 from entry facet 220 to emission facet 222, where it is launched into free-space.

After interrogation of object point 124, scatter signal 112 and reference signal 230 are coupled into collection waveguide 306 at collection facet 224, thereby collectively defining interferometric signal 232.

Collection waveguide 306 is analogous to collection waveguide 218; however, collection waveguide 306 conveys interferometric signal 232 from collection facet 224 directly to exit facet 308, where it is launched into free-space and collimated by lens 206-3.

Disperser 304 receives collimated interferometric signal 232 from lens 206-3 and spatially disperses the spectral content of the light as wavelength signals $\lambda 1$ through $\lambda P$ along the length of detector 210. One skilled in the art will recognize, after reading this Specification, that myriad wavelength dispersion elements suitable for use in disperser 304 are known in the prior art, including diffraction gratings, prisms, blazed gratings, PLC-based dispersers, and the like.

Detector 210 provides output signal 114 to processor 104, as discussed above.

Figure 4:
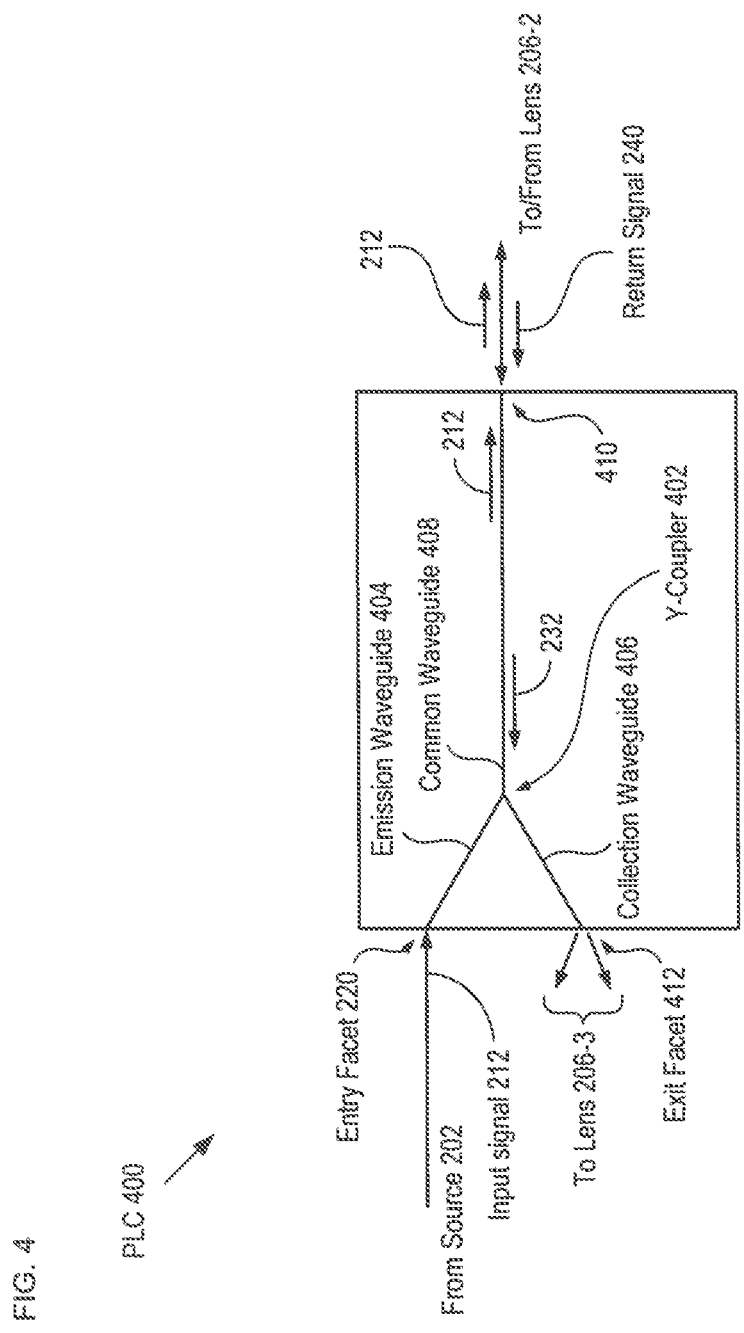
FIG. 4 depicts a schematic drawing of an alternative common-path-interferometer PLC module suitable for use in embodiments of the present invention.

FIG. 4 depicts a schematic drawing of an alternative common-path-interferometer PLC module suitable for use in embodiments of the present invention. PLC module 400 is analogous to PLC module 302; however, PLC module 400 includes a common path for conveying both input signal 212 and interferometric signal 232. PLC module 400 includes y-coupler 402, emission waveguide 404, collection waveguide 406, common waveguide 408, interrogation facet 410, and exit facet 412.

Y-coupler 402 is a conventional integrated-optics y-coupler that serves to optically couple each of emission waveguide 404 and collection waveguide 406 with common waveguide 408.

Each of emission waveguide 404, collection waveguide 406, and common waveguide 408 is a conventional channel waveguide that is analogous to the waveguides of PLC module 204 described above.

Common waveguide 408 is operative for conveying optical signals between y-coupler 402 and interrogation facet 410.

In operation, emission waveguide 404 couples input signal 212 into common waveguide 408, which conveys the input signal to interrogation facet 410 where it is launched into free-space, as described above.

Interrogation facet 410 also receives the optical energy of each of reference signal 230 and scatter signal 112 and optically couples them into common waveguide 408 as interferometric signal 232. It should be noted that interrogation facet 410 serves as both emission facet 222 and collection facet 224 of PLC module 400.

Common waveguide 408 conveys interferometric signal 232 to y-coupler 402, where the signal is coupled into collection waveguide 406. At exit facet 412, the interferometric signal is launched into free-space and provided to disperser 304 via lens 206-3.

In some embodiments, PLC module 400 includes an integrated disperser and a plurality of output waveguides, such as disperser 214 and output waveguides 238 described above and with respect to FIG. 2. In such embodiments, collection waveguide conveys interferometric signal 232 from y-coupler 402 to the disperser rather than launching it into free space at exit facet 412.

As discussed above, neither PLC module 302 nor PLC module 400 includes wavelength sensitive elements. It is an aspect of the present invention that PLCs having little or no wavelength sensitivity can be used in virtually any type of LCI system, including swept-source-OCT systems, and the like, since their functionality is independent of the type of sources and detectors included in such systems.

FIGS. 5A-B depict examples of SS-OCT systems based on PLC modules 302 and 400, respectively. It should be noted, however, that the embodiments disclosed herein are merely exemplary and that additional alternative systems exist within the scope of the present invention. Optical systems 500 and 510 are analogous to optical systems 102 and 300 described above; however, optical systems 500 and 510 are configured for swept-source optical coherence tomography (SS-OCT) by replacing broadband source 202 by a swept source (i.e., source 502), and by replacing multi-element detector 210 by a detector that includes only a single, high-speed photodetector element (i.e., detector 504).

Source 502 is a narrow-linewidth source that provides narrow spectral-line-width light whose wavelength is continuously swept over wavelength range, $R_1$, which extends from approximately 1266 nanometers (nm) to approximately 1358 nm. Source 502 provides optical signal 506 as a periodic signal having a period, $T_1$, of 20 microseconds (i.e., source 502 has a sweep rate of 50 KHz). Typically, source 502 includes additional elements (not shown), such as a fiber Bragg grating, for providing a signal to processor 104 at the start of each sweep period. In some embodiments, source 502 provides an input signal that sweeps through a different wavelength range, $R_1$, and/or has a different sweep period, $T_1$. It will be clear to one skilled in the art, after reading this Specification, how to specify, make, and use source 502.

FIG. 5C depicts input signal 506.

In some embodiments, source 502 is another source suitable for providing a swept-source input signal. Sources suitable for use with the present invention include narrow line-width, tunable sources such as, without limitation, external cavity tunable lasers, super-luminescent diodes, super-continuum generation light sources, akinetic swept sources, tunable vertical cavity light emitting diodes (VCSELs), tunable fiber lasers, broadband sources coupled with tunable wavelength filters, and the like. One skilled in the art will recognize that embodiments of the present invention are suitable for operation in different wavelength regimes.

Input signal 506 is launched into free space to interrogate an object point in scan region 122, which gives rise to return signal 508. Return signal 508 is analogous to return signal 240 described above and with respect to FIG. 2. Return signal 508 is coupled into each PLC as interferometric signal 512.

Detector 504 comprises a high-speed photodetector. It will be clear to one skilled in the art, after reading this Specification, how to specify, make, and use detector 504.

Detector 504 provides output signal 114, which is based on the swept wavelengths of input signal 506. As a result, the wavelength components in interferometric signal 512 include the time dependency of the wavelength sweeps of input signal 506. The time dependency of interferometric signal 512, therefore, can be used to determine the depths of the structural features at the object point 124 under test.

In some embodiments, scanner 118 scans sample signal 110 across each scan region 122 at a rate such that the sample signal is incident on each object point for a measurement time equal to one sweep period, $T_1$. In some embodiments, the measurement time for each object point is equal to a multiple of the sweep period to enable averaging of output signal 114 over several sweep periods.

Because optical systems in accordance with the present invention are based on integrated optics and employ a common-path interferometer arrangement, they can be significantly smaller and less complex than those of the prior art. As a result, the present invention makes its practical to combine many optical systems on a single PLC chip, which would be difficult, if not impossible, to realize using prior-art approaches. The present invention, therefore, enables embodiments that employ multiple sample signals in parallel. In some embodiments, these sample signals are substantially independent of one another, thereby enabling substantially parallel LCI systems, such as parallel OCT. In some embodiments, the sample signals are coordinated with one another, thereby enabling applications such as autocorrelation OCT, dynamic light scattering OCT, and plane-wave parallel OCT.

FIG. 6 depicts a schematic drawing of a multi-signal LCI system in accordance with a first alternative embodiment of the present invention. Optical system 600 includes source 502, reflector 208, PLC module 602, collimator arrays 604-1 and 604-2, and detector array 606, which are arranged as a parallel SS-OCT system comprising M substantially independent optical systems 300. In the exemplary embodiments depicted in FIGS. 6-8, system 600 enables simultaneous interrogation of all M object points in scan region 122 (where M=16) to generate a B-scan of the scan region, thereby obviating scanner 118. Although in this exemplary embodiment, M=16; however, one skilled in the art will recognize, after reading this Specification, that M can be any practical number without departing from the scope of the present invention.

PLC module 602 includes distribution network 608 and collection network 610, which collectively define the waveguided portions of a plurality of common-path interferometers. Distribution network 608 and collection network 610 are formed on separate substrates, which are then joined using a conventional wafer bonding operation, such as thermo-anodic bonding, plasma-assisted bonding, etc., or via a bonding medium, such as epoxy, SU-8, and the like.

FIG. 7A depicts a schematic drawing of distribution network 608. Distribution network 608 includes waveguide network 702, which contains output waveguides 704-1 through 704-16, which are interconnected by a plurality of y-couplers in a tree structure that defines a 1×16 beam splitter. Waveguide network 702 is designed to receive input signal 506 at entry facet 220 and evenly split its energy at a series of y-couplers to provide substantially equal-intensity output signals 706-1 through 706-16, which are launched into free space as interrogation signals 708-1 through 708-16 at emission facets 222-1 through 222-16. Each of interrogation signals 708-1 through 708-16 is analogous to free-space input signal 506 described above and with respect to FIG. 5A.

FIG. 7B depicts a schematic drawing of collection network 610. Collection network 610 includes waveguide network 710, which contains a plurality of collection waveguides 306 arranged to optically couple collection facets 224-1 through 224-16 and exit facets 308-1 through 308-16, respectively. Collection network 610 is designed to receive return signals 508-1 through 508-16 from scan region 122 and provides each to a different collimator of collimator array 604-2.

FIG. 7C depicts an exploded side view of PLC module 602. FIG. 7C depicts a view of PLC Module 602 taken through view b-b of FIGS. 7A and 7B. Each of distribution network 608 and collection network 610 comprises a lower cladding, an upper cladding, and plurality of waveguide cores surrounded by cladding material. Once formed, the two integrated-optics chips are joined, face-to-face, using, for example, plasma-assisted wafer bonding. It should be noted that, typically, the thickness of the upper cladding layers (and/or bonding medium) is such that, when joined, the waveguide cores of each chip are separated by a distance sufficient to mitigate cross-talk between them. Further, in some embodiments, the integrated-optics chips are joined such that there is a slight angle between them. This provides an angle between the waveguides of the distribution network and the waveguides of the collection network that facilitates their respective facets being optically coupled with the same spot.

In operation, distribution network 608 receives input signal 506, distributes it equally into a plurality of 16 interrogation signals 708-1 through 708-16, and provides the interrogation signals to collimator array 604-1.

Collimator array 604-1 is a one-dimensional array of conventional lenslets, each of which collimates a different one of interrogation signals 708-1 through 708-16 and provides it to reflector 208 and scan region 122. In some embodiments, collimator array 604-1 (and/or collimator array 604-2) is a different optical element, such as a cylindrical lens, etc., which is operative for shaping interrogation signals 708-1 through 708-16 and providing them to the reflector and scan region.

Reflector 208 returns an array of reference signals 230 to collimator array 604-1, while passing sample signals 110-1 through 110-16, which simultaneously interrogate all M object points in scan region 122.

Each object point in scan region 122 gives rise to a unique scatter signal 112, which is combined with its corresponding reference signal 230 as one of return signals 508-1 through 508-16. The return signals are received at collection facets 224-1 through 224-16, respectively, where they are coupled into the waveguides of waveguide network 710 as interferometric signals 512-1 through 512-16.

Waveguide network 710 conveys interferometric signals 512-1 through 512-16 to exit facets 308-1 through 308-16, respectively, where they are launched into free-space and collimated by the collimators of collimator array 604-2 and provided to detector array 606. It should be noted that, in some embodiments, detector array 606 is located sufficiently close to exit facets 308 that collimator array 604-2 is not required.

Detector array 606 is a conventional array detector comprising individual detector elements 612-1 through 612-M. Detector arrays suitable for use in embodiments of the present invention include, without limitation, photodetector arrays, linescan cameras, CCD arrays, and the like. Detector elements 612-1 through 612-M provide their outputs to processor 104 as output signal 614.

Optical system 600 has several advantages over the prior art. First, in a conventional OCT system, a B-scan of a scan region is generated by physically scanning a sample signal along the object points of the scan region and sequentially generating an A-scan at each of its object points. As discussed above, this is normally done using a physical beam-scanning mechanism, such as a galvanometric mirror, MEMS mirror, etc. The rate at which the beam-scanning mechanism can move the sample signal across the full width of the scan region is usually on the order of a few hundred Hertz. The rate at which an A-scan can be generated at each object point is limited by the sweep frequency of the swept-source in SS-OCT or the sample frequency of the linescan camera in SC-OCT, however, which are normally on the order of 50 KHz or more. As a result, the full-scan bandwidth of the beam-scanning mechanism is the limiting factor for the B-scan frame rate in a conventional OCT system.

Second, physically moving a sample signal across the length of the scan region to sequentially acquire the A-scans gives rise to bulk motion artifacts, which must be compensated. This complicates estimation of dynamic parameters, such as fluid flow, blood flow, etc., as well as certain static parameters, such as layer thickness, layer refractive index, birefringence, and the like Because system 600 generates a B-scan of scan region 122 by simultaneously generating A-scans of all its object points, there is no scanning mechanism to limit the measurement bandwidth of the system. As a result, system 600 can generate a complete B-scan at a rate that approaches the much higher operating frequencies of a swept source or linescan camera. Further, since there is no need to physically move a sample signal in system 600, it mitigates bulk-motion artifacts thereby improving dynamic and static parameter estimation.

Although optical system 600 is configured for swept-source operation, it will be clear to one skilled in the art, after reading this Specification, how to specify, make, and use alternative embodiments wherein optical system 600 operates as a spectral-domain system. For example, by replacing source 502 with a broadband source and spectrally dispersing the free-space interferometric signals across a two-dimensional array of detector elements, optical system 600 could operate as an SD-OCT system.

It is known in the prior art that flow velocity of a fluid can be quantitatively determined with OCT by employing an autocorrelation method. Typically, such prior-art systems measure an A-scan for each of many object points along the flow direction many times (e.g., a thousand or more). For a sampling frequency of 50 kHz, therefore, the acquisition time for a single autocorrelation is 20 milliseconds, which is too slow for many applications—in particular, in-vivo applications.

It is an additional aspect of the present invention that PLC-based OCT systems in accordance with the present invention can reduce the required acquisition times to such an extent that in-vivo applications, such as monitoring localized blood flow, are practical without sacrificing temporal resolution. The ability to integrate many integrated-optics OCT systems in parallel within a single PLC module enables different sample arms to image different spatial locations of a sample region. Further, by spacing the sample arms in a non-uniform pattern (e.g., spaced as a Golomb ruler, logarithmic ruler, etc.), the number of parallel OCT systems necessary to measure a scan region can be reduced significantly. For the purposes of this Specification, including the appended claims, the term "non-linear ruler" is defined as an arrangement of elements (e.g., tick marks, collection facets, collection waveguides, OCT systems, sample arms, etc.) that are arranged with non-uniform spacing but that collectively enable determination of a measurement parameter.

FIGS. 7D and 7E depict schematic drawings of a distribution network and collection network, respectively, in accordance with an alternative embodiment of the present invention. Distribution network 712 and collection network 714 are analogous to distribution network 608 and collection network 610 described above; however, the inclusion of distribution network 712 and collection network 714 in PLC module 602 enables operation of optical system 600 as a sparse, parallel OCT measurement system that employs an autocorrelation method for determination of fluid dynamics, such as flow, in a turbid media. Further, the inclusion of collection network 714 enables additional system capabilities, such as quantifying depth-resolved sample structures (e.g., flow, diffusion, and other sample and dynamic parameters).

Distribution network 712 includes waveguide network 716, which includes output waveguides 718-1 through 718-6. Output waveguides 718-1 through 718-6 are interconnected by a plurality of y-couplers in a tree structure that defines a 1×6 beam splitter. Waveguide network 716 receives input signal 506 at entry facet 220 and evenly splits its energy via a series of y-couplers to provide substantially equal-intensity output signals 720-1 through 720-6, which are launched into free space as interrogation signals 722-1 through 722-6 at emission facets 724-1 through 724-6. Output waveguides 718 and their respective emission facets 724 are arranged such that their spacing follows a Golomb ruler distribution of 0:1:4:10:12:17.

Collection network 714 includes waveguide network 726, which comprises collection waveguides 728-1 through 728-6. Each of collection waveguides 728 is analogous to collection waveguide 306, described above; however, collection waveguides 728 are arranged such that their spacing follows the same Golomb ruler distribution of distribution network 712 (i.e., 0:1:4:10:12:17). Each of collection waveguides 728 receives its respective return signal 730 from a different lenslet in collimator array 604-1 and typically passes it, as interferometric signal 732, to a multi-fiber array (not shown), which then conveys the signals to a suitable detector.

The predefined and specific distances or each of distribution network 712 and collection network 714 mitigate data loss from the sparse collection of return signals 508. The arrangements of the waveguides of distribution network 712 and collection network 714 described above, for example, enable the decorrelation of 17 signals to be obtained with only six measurements.

It should be noted that the six-waveguide Golomb-ruler distribution described above is merely one example of a suitable sparse waveguide distribution that defines a non-linear ruler and that other distributions are possible without departing from the scope of the present invention. Other suitable distributions include, without limitation, Golomb-order distribution of different numbers of waveguides (e.g., a Golomb distribution of 12 waveguides would enable measurement of the decorrelation of 85 signals), multi-waveguide arrangements based on logarithmic rulers, and the like.

It should be further noted that the number and spacing of waveguides for any sparse distribution that defines a non-linear ruler is a matter of design, and is typically based on other parameters, such as beam waist, the range of flow velocities to be measured, etc.

FIG. 8 depicts an alternative PLC module suitable for use in the first alternative embodiment of the present invention. PLC module 800 includes distribution network 608 and collection network 802, which are arranged to define M parallel optical systems 510, as described above and with respect to FIG. 5C; however, their emission waveguides 304 are included in distribution network 608.

It should be noted that, in PLC module 800, distribution network 608 and collection network 802 are formed on a single substrate. As a result, PLC module 800 exhibits more optical loss that PLC module 602 due to the need for waveguide crossings, each of which contributes about 0.3 dB of optical loss.

As briefly mentioned above, the present invention also enables embodiments wherein multiple output signals (e.g., interrogation signals 708) are provided such that they combine to form a composite optical signal, such as a plane wave, a curved wavefront, beam, etc. In such embodiments, the phase of one or more of the output signals is controlled to dictate one or more properties of the combined output signal, such as wave shape, propagation direction, etc.— similar to the way in which the individual output signals from each element of a phased-array antenna are controlled to collectively define a radio beam.

It should be noted that, in some embodiments, the output waveguides of PLC module 800 are arranged in a sparse arrangement, as described above and with respect to FIGS. 7D-E.

FIG. 9 depicts a schematic drawing of a multi-signal LCI system in accordance with a second alternative embodiment of the present invention. Optical system 900 includes source 502, PLC module 902, collimator array 604-2, and detector array 606. Optical system 900 is operative for interrogating scan region 122 using a series of plane waves having different inclination angles relative to the scan region, thereby enabling interrogation of the scan region under varied illumination conditions. In some embodiments, optical system 900 is operative for interrogating a scan region with one or more composite optical signals whose shape is controlled as other than a plane wave.

PLC module 902 is analogous to PLC module 600 described above, wherein distribution network 608 is replaced with distribution network 904.

Figure 10:
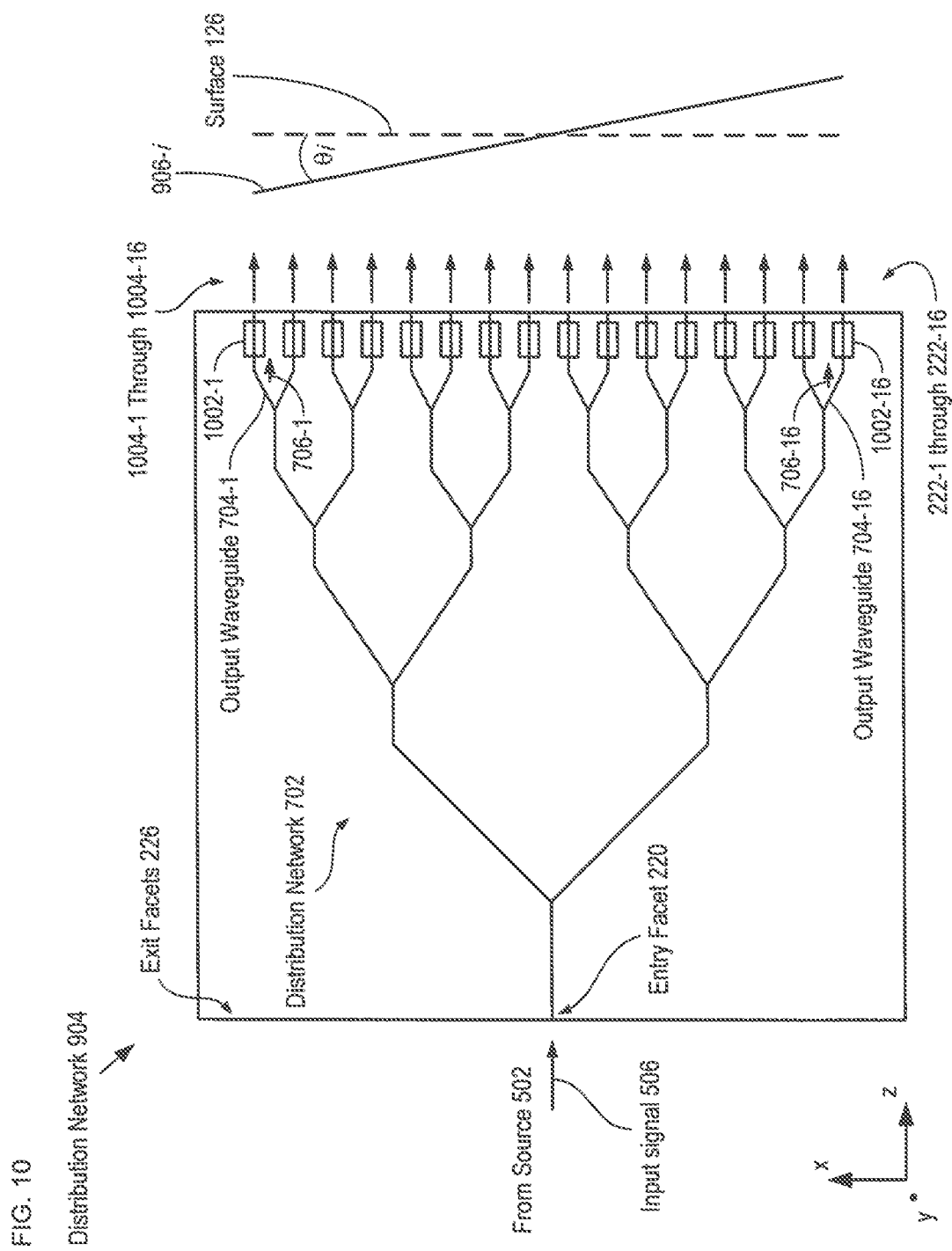
FIG. 10 depicts a schematic drawing of distribution network 904.

FIG. 10 depicts a schematic drawing of distribution network 904. Distribution network 904 includes waveguide network 702 and phase controllers 1002-1 through 1002-16, which are operatively coupled with output waveguides 704-1 through 704-16, respectively. Typically, output waveguides 704-1 through 704-16 are spaced as closely as possible along the x-direction but with sufficient separation to avoid significant cross-talk between the output signals.

Figure 11:
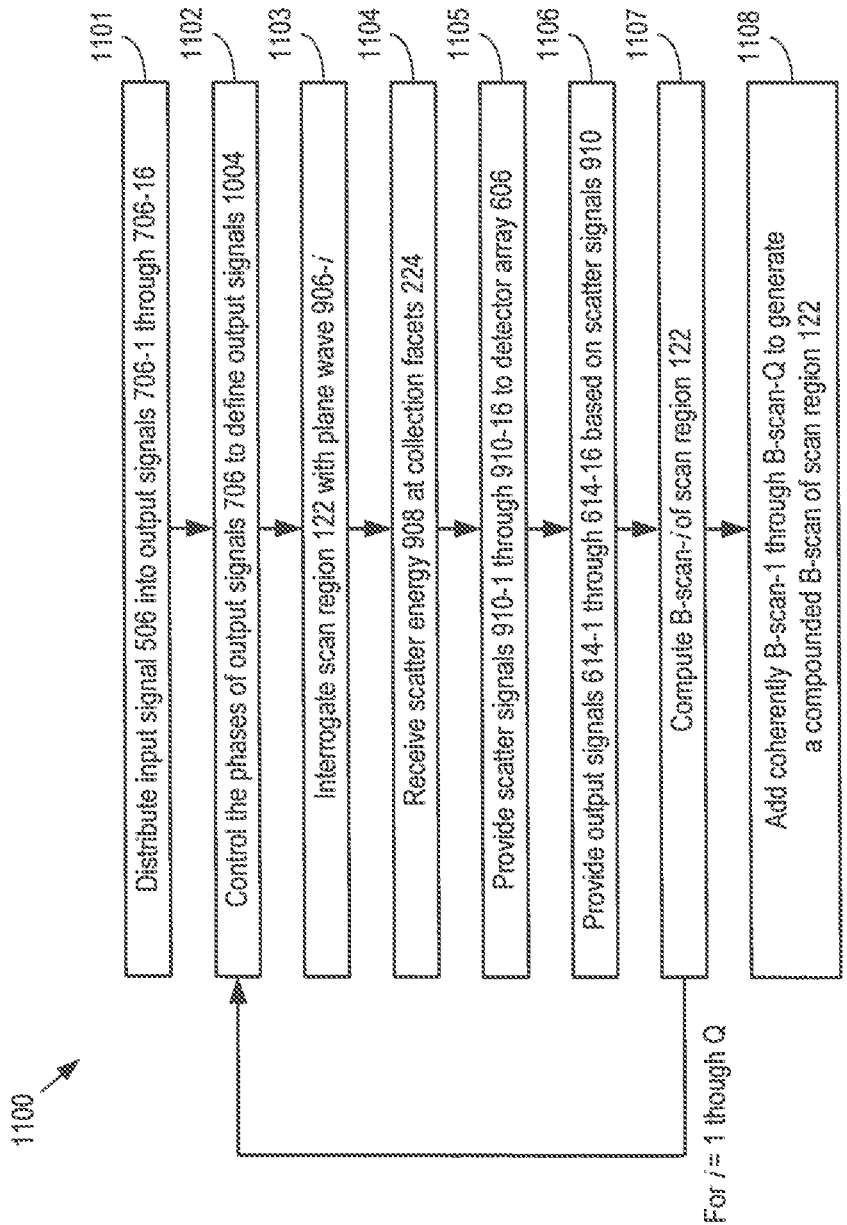
FIG. 11 depicts operations of a method for interrogating a scan region with a series of P different compound optical signals.

FIG. 11 depicts operations of a method for interrogating a scan region with a series of P different compound optical signals. Method 1100 begins with operation 1101, wherein distribution network 904 splits input signal 506 into output signals 706-1 through 706-16 in output waveguides 704-1 through 704-16, respectively.

At operation 1102, for each of i=1 through Q, the phase of each of output signals 706 is controlled to define sample signals 1004-1 through 1004-16, which collectively define plane wave 906-$i$.

FIG. 12 depicts a schematic drawing of a cross-sectional view of a phase-controller in accordance with the second alternative embodiment of the present invention. Phase-controller 1002 is a phase shifter that controls the phase of output signal 706 by controlling a physical property (e.g., strain, temperature, etc.) of one or more of the constituent layers of output waveguide 704. In the exemplary embodiment described herein, phase-controller 1002 is a stress-inducing (SI) phase shifter as described in U.S. Patent Publication No. 20150110441. Phase-controller 1002 comprises strain element 1202, which is operatively coupled with the waveguide core of output waveguide 704. Strain element 1202 includes lower electrode 1204, piezoelectric layer 1206, and upper electrode 12086. Phase controller 1002 is representative of each of phase controllers 1002-1 through 1002-16.

Each of lower electrode 1204 and upper electrode 1208 is a layer of electrically conductive material, such as platinum, gold, aluminum, etc. The thickness of lower electrode 1204 and upper electrode 1208 is a matter of design choice.

Piezoelectric layer 1206 is a layer of piezoelectric material, such as lead zirconate titanate (PZT). Piezoelectric layer 1206 is patterned to form a substantially rectangular region on which upper electrode 1208 is formed. One skilled in the art will recognize that the thickness of piezoelectric layer 1206, and the width and length of upper electrode 1208 effectively define the operative dimensions of strain element 1202, as well as its operating characteristics.

In some embodiments, one or both of piezoelectric layer 1206 and lower electrode 1204 are not patterned and, therefore, remain over the entire surface of the substrate. In such embodiments, vias are formed through the piezoelectric material to enable electrical contact to be established to the underlying lower electrode.

In phase controller 1002, strain element 1202 is disposed on a region of output waveguide 704 where its upper cladding has been thinned to enhance the transfer of mechanical strain from the piezoelectric layer into the layers of the waveguide. In some embodiments, the upper cladding of output waveguide 704 is shaped to form vertical sidewalls upon which piezoelectric layer 1206 is disposed.

Processor 104 provides control signals to phase controller 1002, which give rise to a voltage differential between lower electrode 1204 and upper electrode 1208, which induces a strain in piezoelectric layer 1206. This strain is transmitted into the underlying waveguide layers, resulting in a change in its effective refractive index and, thus, creating a phase change in output signal 706 as it passes through output waveguide 704 giving rise to sample signal 1004.

Although in this embodiment each of phase controllers 1002 is an SI phase controller, in some embodiments, at least one of phase controllers 1002-1 through 1002-16 is a conventional thermo-optic (TO) phase shifter comprising an ohmic heater disposed on the upper cladding of a portion of its respective output waveguide 704.

At operation 1103, plane wave 906-$i$ interrogates scan region 122 by penetrating into its depth and giving rise to scatter energy 908, which results from the interaction between the plane wave and the structural features in the depth of the scan region.

FIG. 13A depicts a schematic drawing of scan region 122 during its interrogation with plane wave 906-$i$, where plane wave 906-$i$ is substantially normal to surface 126 (i.e., $\theta_i$=0). As depicted, the x-direction denotes the distance along the scan region while the z-direction denotes depth into the sample medium (i.e., the typical direction of an A-scan).

As the optical energy of the plane wave penetrates into the depth of scan region 122, each structural feature 1302 within the region acts as a point source that scatters some of the energy as a spherical wave.

At operation 1104, collection network 610 receives scatter energy 908 at collection facets 224-1 through 224-16. It should be noted that scatter energy 908 includes contributions from all structural features 1302 in the scan region. Scatter energy 908 is coupled into waveguide network 706 as scatter signals 910-1 through 910-16.

FIG. 13B depicts the propagation path for energy of plane wave 906-$i$ scattered by a representative structural feature 1302-1 located at position ($x_1, z_1$) within scan region 122. A structural feature positioned at ($x_1, z_1$) scatters a spherical wave that reaches collection facets 224 of collection network 610. The total optical path length, $\Delta_{OPL}$, travelled by energy scattered by structural feature 1302-1 and received by a collection facet 224 located at $x_2$ is given as:

$$\Delta_{OPL}(z_1,x_1,x_2)=z_1+\sqrt{z_1^2+(x_1-x_2)^2}$$

At operation 1105, scatter signals 910-1 through 910-16 are conveyed to exit facets 308-1 through 308-16, respectively, and launched into free space, collimated by collimator array 604-2, and provided to detector array 606.

At operation 1106, scatter signals 910-1 through 910-16 are detected at detector elements 612-1 through 612-16, which provide unique output signals 614-1 through 614-16 to processor 104.

At operation 1107, processor 104 processes output signal 614 to compute a B-scan of region 122. Processor 104 computes a B-scan-$i$ by first converting the Fourier-domain information in the output signal into spatial information, then adding coherently the contribution of each scatter point (i.e., each structural feature 1302) by shifting each detector signal by $\Delta_{OPL}(z,x_1,x_2)$ and adding them in the array direction (i.e., along the x-direction).

Operations 1102 through 1107 are repeated for each of $i$=1 to Q, where the inclination angle, $\theta_i$, for each plane wave 906-$i$ is different. By changing the inclination for each plane wave, the total optical path length for each structural feature 1302 is changed.

FIG. 13C depicts the propagation path for energy of a plane wave 906-$i$, tilted at an angle, $\alpha$, as it is scattered by a representative structural feature 1302-1 located at position ($x_1, z_1$) within scan region 122. For a tilted plane wave having an inclination angle of a, the total optical path length, $\Delta_{OPL}(\alpha,z,x_1,x_2)$, is given by:

$$\Delta_{OPL}(\alpha,z_1,x_1,x_2)=z_1\cos(\alpha)+z_1\sin(\alpha)+\sqrt{z_1^2+(x_1-x_2)^2}$$

At operation 1108, processor 104 adds coherently B-scan-1 through B-scan-Q to generate a compounded B-scan of scan region 122. Typically, the B-scans are added without taking the envelope of the composite optical signals (i.e., plane waves 906-1 through 906-P) or any other non-linear procedure to ensure a coherent addition. By interrogating scan region 122 with plane waves having different inclination angles, the image quality of the compounded B-scan (e.g., its lateral resolution) is improved.

It should be noted that, while any practical number of plane waves 906 can be used to interrogate a sample without departing from the scope of the present invention, the frame rate for the imaging system is reduced commensurately.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A low coherence interferometry (LCI) system for forming an image of a sample, the LCI system comprising an optical system that is operative for interrogating a first object point of the sample with a first sample signal, the optical system comprising:
   a source for providing an input optical signal;
   a planar lightwave circuit (PLC) module that is operative for receiving the input optical signal and providing a first optical signal that is based on the input optical signal, the PLC module including a first surface waveguide having a first facet; and a reflector that is dimensioned and arranged to distribute the first optical signal into a first reference signal and the first sample signal;

wherein the source, PLC module, and reflector collectively define a portion of a first interferometer that is a common-path interferometer in which the first reference signal and the first sample signal share a first common path that includes at least one surface waveguide included in the PLC module; and wherein the PLC module, the reflector, and the sample are arranged such that the first facet couples the first reference signal and a first scatter signal into the first surface waveguide as a first interferometric signal, the first scatter signal including a first plurality of wavelength signals that is based on the first sample signal and at least one structural feature of the first object point, wherein the PLC module is directional-coupler free.

2. The LCI system of claim 1 wherein the PLC module further includes:

a second surface waveguide that is optically coupled with the source; and a third surface waveguide that is optically coupled with a detector;

wherein the first surface waveguide, second surface waveguide and third surface waveguide are monolithically integrated on a substrate and optically coupled at a y-coupler such that (1) the second surface waveguide provides the first optical signal to the first surface waveguide; and (2) the first surface waveguide provides at least a portion of the first interferometric signal to the third surface waveguide.

3. The LCI system of claim 1 wherein the PLC module includes a second surface waveguide having a second facet, and wherein the reflector receives the first optical signal from the second facet, and further wherein the first surface waveguide and second surface waveguide are monolithically integrated on a substrate such that they are not optically coupled on the substrate.

4. The LCI system of claim 3 wherein the first surface waveguide is disposed on a first substrate and the second surface waveguide is disposed on a second substrate, the PLC module including the first substrate and second substrate.

5. The LCI system of claim 1 further comprising a first disperser for receiving the first interferometric signal from the first surface waveguide and spatially dispersing the first plurality of wavelength signals.

6. The LCI system of claim 5 wherein the PLC module includes the first disperser and a plurality of output surface waveguides, and wherein the disperser is dimensioned and arranged to spatially disperse the first plurality of wavelength signals such that each wavelength signal is coupled into a different one of the plurality of output surface waveguides.

7. The LCI system of claim 1 wherein the PLC module further comprises a second surface waveguide having a second facet;

wherein the PLC module is further operative for providing a second optical signal that is based on the input optical signal;

wherein the reflector is dimensioned and arranged to distribute the second optical signal into a second reference signal and a second sample signal;

wherein the source, PLC module, and reflector collectively define a portion of a second interferometer that is a common-path interferometer in which the second reference signal and the second sample signal share a second common path that includes at least one surface waveguide included in the PLC module; and wherein the PLC module, the reflector, and the sample are arranged such that the second facet couples the second reference signal and a second scatter signal into the second surface waveguide as a second interferometric signal, the second scatter signal including a second plurality of wavelength signals that is based on the second sample signal and at least one structural feature of the second object point.

8. A low coherence interferometry (LCI) system for forming an image of a sample, the LCI system comprising an optical system that is operative for interrogating a first object point of the sample with a first sample signal, the optical system comprising:

a source for providing an input optical signal;

a planar lightwave circuit (PLC) module that is operative for receiving the input optical signal and providing a first optical signal that is based on the input optical signal, the PLC module including a first surface waveguide having a first facet; and a reflector that is dimensioned and arranged to distribute the first optical signal into a first reference signal and the first sample signal, wherein the reflector has a reflectivity that is nonuniform in at least one dimension, and wherein the reflector is movable with respect to the sample along the at least one dimension;

wherein the source, PLC module, and reflector collectively define a portion of a first interferometer that is a common-path interferometer in which the first reference signal and the first sample signal share a first common path that includes at least one surface waveguide included in the PLC module;

wherein the PLC module, the reflector, and the sample are arranged such that the first facet couples the first reference signal and a first scatter signal into the first surface waveguide as a first interferometric signal, the first scatter signal including a first plurality of wavelength signals that is based on the first sample signal and at least one structural feature of the first object point.

9. The LCI system of claim 8 wherein the PLC module further includes:

a second surface waveguide that is optically coupled with the source; and a third surface waveguide that is optically coupled with a detector;

wherein the first surface waveguide, second surface waveguide and third surface waveguide are monolithically integrated on a substrate and optically coupled at a y-coupler such that (1) the second surface waveguide provides the first optical signal to the first surface waveguide; and (2) the first surface waveguide provides at least a portion of the first interferometric signal to the third surface waveguide.

10. The LCI system of claim 8 wherein the PLC module includes a second surface waveguide having a second facet, and wherein the reflector receives the first optical signal from the second facet, and further wherein the first surface waveguide and second surface waveguide are monolithically integrated on a substrate such that they are not optically coupled on the substrate.

11. The LCI system of claim 10 wherein the first surface waveguide is disposed on a first substrate and the second surface waveguide is disposed on a second substrate, the PLC module including the first substrate and second substrate.

12. The LCI system of claim 8 further comprising a first disperser for receiving the first interferometric signal from the first surface waveguide and spatially dispersing the first plurality of wavelength signals.

13. The LCI system of claim 12 wherein the PLC module includes the first disperser and a plurality of output surface waveguides, and wherein the disperser is dimensioned and arranged to spatially disperse the first plurality of wavelength signals such that each wavelength signal is coupled into a different one of the plurality of output surface waveguides.

14. A low coherence interferometry (LCI) system for forming an image of a sample, the LCI system comprising an optical system that is operative for interrogating a first object point of the sample with a first sample signal, the optical system comprising:
  a source for providing an input optical signal;
  a planar lightwave circuit (PLC) module that is operative for receiving the input optical signal and providing a first optical signal that is based on the input optical signal, the PLC module including a first surface waveguide having a first facet; and
  a reflector that is dimensioned and arranged to distribute the first optical signal into a first reference signal and the first sample signal;
  wherein the source, PLC module, and reflector collectively define a portion of a first interferometer that is a common-path interferometer in which the first reference signal and the first sample signal share a first common path that includes at least one surface waveguide included in the PLC module; and
  wherein the PLC module, the reflector, and the sample are arranged such that the first facet couples the first reference signal and a first scatter signal into the first surface waveguide as a first interferometric signal, the first scatter signal including a first plurality of wavelength signals that is based on the first sample signal and at least one structural feature of the first object point;
  wherein the optical system is further operative for interrogating a plurality of object points of the sample with a plurality of sample signals that includes the first sample signal, the plurality of object points including the first object point;
  wherein the reflector is dimensioned and arranged to distribute each of a plurality of optical signals received from the PLC module into a plurality of reference signals and the plurality of sample signals, wherein the plurality of reference signals includes the first reference signal and each of the plurality of corresponding sample signals corresponds to a different one of the plurality of reference signals;
  wherein the PLC module further includes:
    (i) a distribution network that includes a first plurality of surface waveguides that is dimensioned and arranged to receive the input optical signal at an input facet and distribute it into the plurality of optical signals at a plurality of emission facets that is arranged in a first arrangement that defines a non-linear ruler; and
    (ii) a collection network that includes a second plurality of surface waveguides having a plurality of collection facets that is arranged in the first arrangement, the second plurality of surface waveguides including the first surface waveguide and the plurality of collection facets including the first facet;
  wherein the source, PLC module, and reflector collectively define a plurality of common-path interferometers, each of which is operative for interrogating a different one of the plurality of object points with a different sample signal of the plurality thereof to generate a scatter signal that is indicative of a characteristic of that object point; and
  wherein the PLC module, reflector, and sample are arranged such that the plurality of collection facets couples each of the plurality of reference signals and its corresponding scatter signal into its respective surface waveguide of the second plurality thereof as an interferometric signal.

15. The LCI system of claim 14 wherein the PLC module further includes:
  a second surface waveguide that is optically coupled with the source; and
  a third surface waveguide that is optically coupled with a detector;
  wherein the first surface waveguide, second surface waveguide and third surface waveguide are monolithically integrated on a substrate and optically coupled at a y-coupler such that (1) the second surface waveguide provides the first optical signal to the first surface waveguide; and (2) the first surface waveguide provides at least a portion of the first interferometric signal to the third surface waveguide.

16. The LCI system of claim 14 wherein the PLC module includes a second surface waveguide having a second facet, and wherein the reflector receives the first optical signal from the second facet, and further wherein the first surface waveguide and second surface waveguide are monolithically integrated on a substrate such that they are not optically coupled on the substrate.

17. The LCI system of claim 16 wherein the first surface waveguide is disposed on a first substrate and the second surface waveguide is disposed on a second substrate, the PLC module including the first substrate and second substrate.

18. The LCI system of claim 14 further comprising a first disperser for receiving the first interferometric signal from the first surface waveguide and spatially dispersing the first plurality of wavelength signals.

19. The LCI system of claim 18 wherein the PLC module includes the first disperser and a plurality of output surface waveguides, and wherein the disperser is dimensioned and arranged to spatially disperse the first plurality of wavelength signals such that each wavelength signal is coupled into a different one of the plurality of output surface waveguides.

20. A method for forming an image of a sample, the method comprising:
  providing a planar lightwave circuit (PLC) module that includes a first surface waveguide having a first facet, wherein the PLC module receives an input optical signal and provides a first optical signal that is based on the input optical signal, wherein the PLC module is directional-coupler free;
  providing a reflector that is partially transmissive for the first optical signal, wherein the PLC module and the reflector are arranged to collectively define at least a portion of a first common-path interferometer having a first common path for a first reference signal and a first sample signal, and wherein the reflector receives the first optical signal from the PLC module;

distributing the first optical signal into the first reference signal and the first sample signal at the reflector;

interrogating a first object point of the sample with the first sample signal to generate a first scatter signal having a first plurality of wavelength signals that is based on the first sample signal and at least one structural feature of the first object point;

coupling each of the first reference signal and the first scatter signal into the first surface waveguide at the first facet to form a first interferometric signal that includes the first plurality of wavelength signals; and generating a first output signal based on the first plurality of wavelength signals.

21. The method of claim 20 further comprising:

providing the PLC module such that it further comprises a second surface waveguide having a second facet, wherein the PLC module and the reflector further define at least a portion of a second common-path interferometer having a second common path for a second reference signal and a second sample signal;

providing a second optical signal that Is based on the input optical signal, the second optical signal being provided by the PLC module and being based on the input optical signal;

distributing the second optical signal into the second reference signal and the second sample signal at the reflector;

interrogating a second object point of the sample with the second sample signal to generate a second scatter signal having a second plurality of wavelength signals that is based on the second sample signal and at least one structural feature of the second object point;

coupling each of the second reference signal and the second scatter signal into the second surface waveguide at the second facet to form a second interferometric signal that includes the second plurality of wavelength signals; and generating a second output signal based on the second plurality of wavelength signals.

* * * * *